(12) United States Patent
Levi et al.

(10) Patent No.: US 11,748,984 B2
(45) Date of Patent: Sep. 5, 2023

(54) SYSTEM AND METHOD FOR HORTICULTURE VIABILITY PREDICTION AND DISPLAY

(71) Applicant: Planttagg, Inc., Dallas, TX (US)

(72) Inventors: Andrew Levi, Dallas, TX (US); Shawn Gentry, Dallas, TX (US); George R. Schultz, Coppell, TX (US)

(73) Assignee: Planttagg, Inc., Dallas, TX (US)

( * ) Notice: Subject to any disclaimer, the term of this patent is extended or adjusted under 35 U.S.C. 154(b) by 288 days.

(21) Appl. No.: 17/302,532

(22) Filed: May 5, 2021

(65) Prior Publication Data

US 2021/0350235 A1 Nov. 11, 2021

Related U.S. Application Data

(60) Provisional application No. 62/704,344, filed on May 5, 2020.

(51) Int. Cl.
*G06V 20/20* (2022.01)
*G06N 3/08* (2023.01)
(Continued)

(52) U.S. Cl.
CPC ............ *G06V 20/20* (2022.01); *G06F 16/285* (2019.01); *G06F 16/53* (2019.01); *G06F 18/213* (2023.01);
(Continued)

(58) Field of Classification Search
CPC .... G06V 20/20; G06V 10/454; G06V 10/764; G06V 10/774; G06V 10/82; G06V 20/188; G06V 20/10; G06V 10/255; G06V 20/68; G06F 16/285; G06F 16/53; G06F 18/213; G06N 3/04; G06N 3/08; G06N 3/045; G06N 3/048; G06N 5/041; G06N 3/084; G06T 2207/30188; G06T 2207/20081; G06T 2207/20084; G06T 7/0012; G06T 7/11; G06T 2207/10024;
(Continued)

(56) References Cited

U.S. PATENT DOCUMENTS 9,031,884 B1* 5/2015 Mewes ................... A01G 13/00
706/12
10,657,372 B2* 5/2020 Pattnaik .................... A01G 7/00
(Continued)

*Primary Examiner* — Michael S Osinski
(74) *Attorney, Agent, or Firm* — Schultz & Associates, P.C.

(57) ABSTRACT

A system and method is disclosed for plant maintenance, identification and viability scoring. An application is located on consumer devices connected to the server. The application, operating on a smart phone, utilizes onboard GPS, user input, and camera subsystems to customize plant care tips specific to a yard location and plant type. Images may be submitted to the server to identify a plant type through convolutional neural network image recognition. The invention uses another artificial neural network to predict a plant's viability score. The server receives input, such as plant type, soil type, yard location, and amount of sunlight, and the server retrieves local climactic data and plant type optimal values to return the plant's viability score for the selected location. Another aspect of the invention generates and displays an augmented reality display of a plant in the user's yard.

20 Claims, 31 Drawing Sheets

(51) Int. Cl.
    *G06F 16/53*              (2019.01)
    *G06N 3/04*               (2023.01)
    *G06F 16/28*              (2019.01)
    *G06F 18/213*            (2023.01)
    *G06V 10/764*           (2022.01)
    *G06V 10/774*           (2022.01)
    *G06V 10/82*             (2022.01)
    *G06V 10/44*             (2022.01)

(52) U.S. Cl.
    CPC ................ *G06N 3/04* (2013.01); *G06N 3/08* (2013.01); *G06V 10/454* (2022.01); *G06V 10/764* (2022.01); *G06V 10/774* (2022.01); *G06V 10/82* (2022.01)

(58) Field of Classification Search
    CPC . G06T 2207/30128; G06T 2207/10032; G06T 2207/10036; G06T 2207/30242; A01B 79/005; A01B 79/02; G06Q 50/02; G06Q 10/04
    See application file for complete search history.

(56) References Cited

U.S. PATENT DOCUMENTS

| | | | | |
|---|---|---|---|---|
| 10,909,368 | B2 * | 2/2021 | Guo | G06V 10/30 |
| 10,986,789 | B1 * | 4/2021 | Roberts | A01G 9/26 |
| 11,263,707 | B2 * | 3/2022 | Perry | A01B 79/005 |
| 11,510,364 | B2 * | 11/2022 | Vandike | A01D 41/127 |
| 2013/0028487 | A1 * | 1/2013 | Stager | B07C 5/342 382/110 |
| 2013/0238201 | A1 * | 9/2013 | Redden | G06V 10/255 701/50 |
| 2014/0258173 | A1 * | 9/2014 | Blanchard | G06Q 10/067 705/348 |
| 2017/0038749 | A1 * | 2/2017 | Mewes | A01G 25/167 |
| 2018/0240228 | A1 * | 8/2018 | Jackson | G06V 20/10 |
| 2018/0330166 | A1 * | 11/2018 | Redden | G06V 20/188 |
| 2018/0330247 | A1 * | 11/2018 | Cohen | G06N 20/00 |
| 2019/0377946 | A1 * | 12/2019 | Genty | G06T 7/0004 |
| 2020/0226375 | A1 * | 7/2020 | Albrecht | G01J 3/2823 |
| 2020/0257997 | A1 * | 8/2020 | Mewes | A01G 22/00 |
| 2020/0320682 | A1 * | 10/2020 | Alexander | G06T 7/90 |
| 2020/0401883 | A1 * | 12/2020 | Yang | G05D 1/0033 |
| 2021/0056307 | A1 * | 2/2021 | Li | G06V 10/764 |
| 2021/0068335 | A1 * | 3/2021 | Noivirt-Brik | A01M 21/00 |
| 2021/0103728 | A1 * | 4/2021 | Young | G06V 20/10 |
| 2021/0270792 | A1 * | 9/2021 | Alameh | G01J 3/0205 |
| 2021/0349933 | A1 * | 11/2021 | Funabashi | A01G 22/00 |
| 2021/0365683 | A1 * | 11/2021 | Badhwar | G06V 20/20 |
| 2021/0378182 | A1 * | 12/2021 | Xu | A01G 7/04 |
| 2021/0383535 | A1 * | 12/2021 | Li | G06V 20/188 |
| 2022/0012385 | A1 * | 1/2022 | Cohen | G06V 10/764 |
| 2022/0245805 | A1 * | 8/2022 | Wildt | G06F 18/40 |
| 2023/0017425 | A1 * | 1/2023 | Bereciartua-Perez | G06T 7/0002 |
| 2023/0017444 | A1 * | 1/2023 | Von Rundstedt | G06V 10/774 |
| 2023/0071265 | A1 * | 3/2023 | Bereciartua-Perez | G06V 10/454 |

* cited by examiner

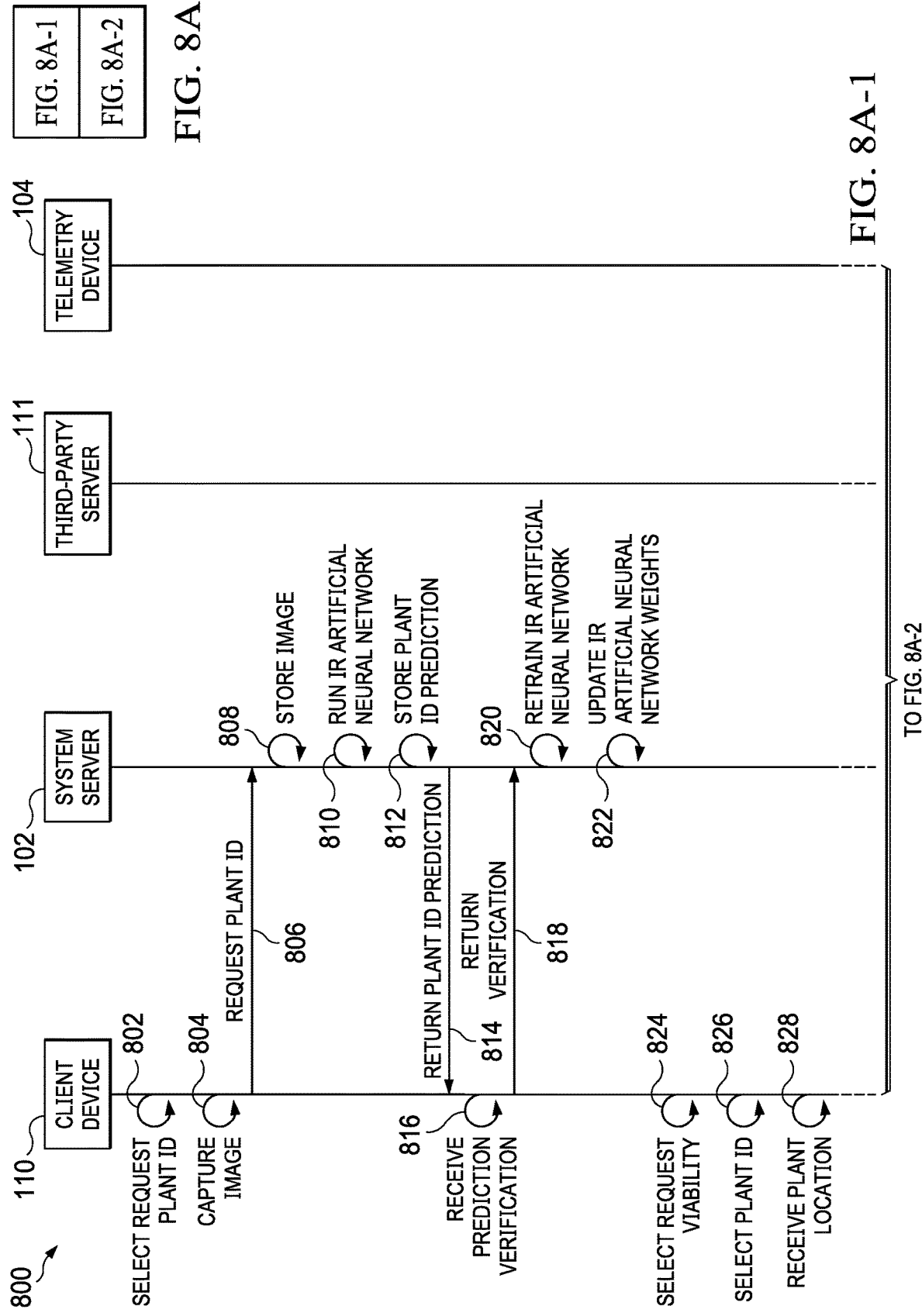

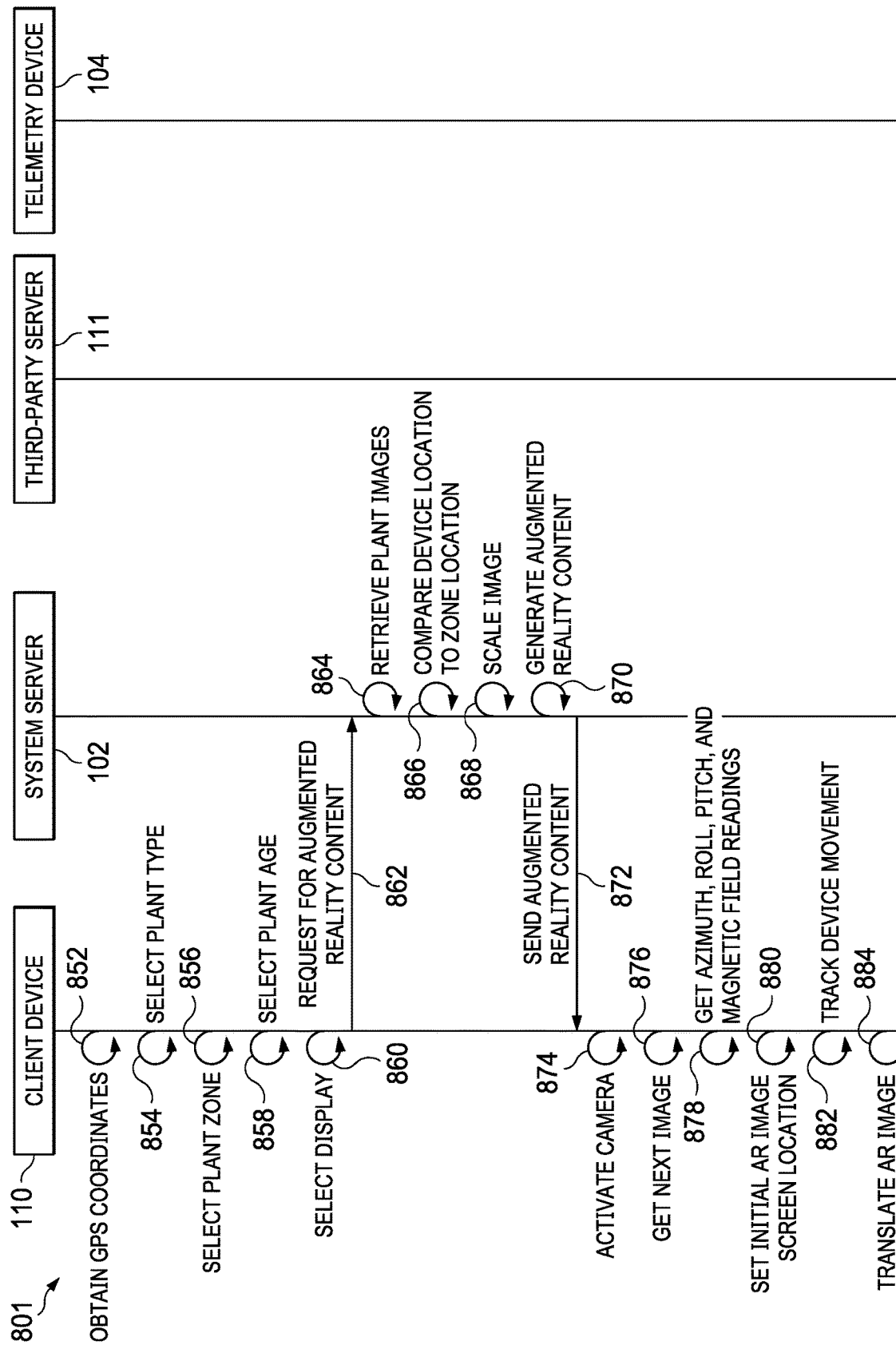

```
private SensorManagermSensorManager;
...
// Rotation matrix based on current readings
from accelerometer and magnetometer.
final float[ ] rotationMatrix= new float[9];
mSensorManager.getRotationMatrix(rotationMatrix,
null,
accelerometerReading, magnetometerReading);
// Express the updated rotation matrix as three
orientation angles.
final float[ ] orientationAngles= new float[3];
mSensorManager.getOrientation(rotationMatrix,
orientationAngles);
```

FIG. 9A

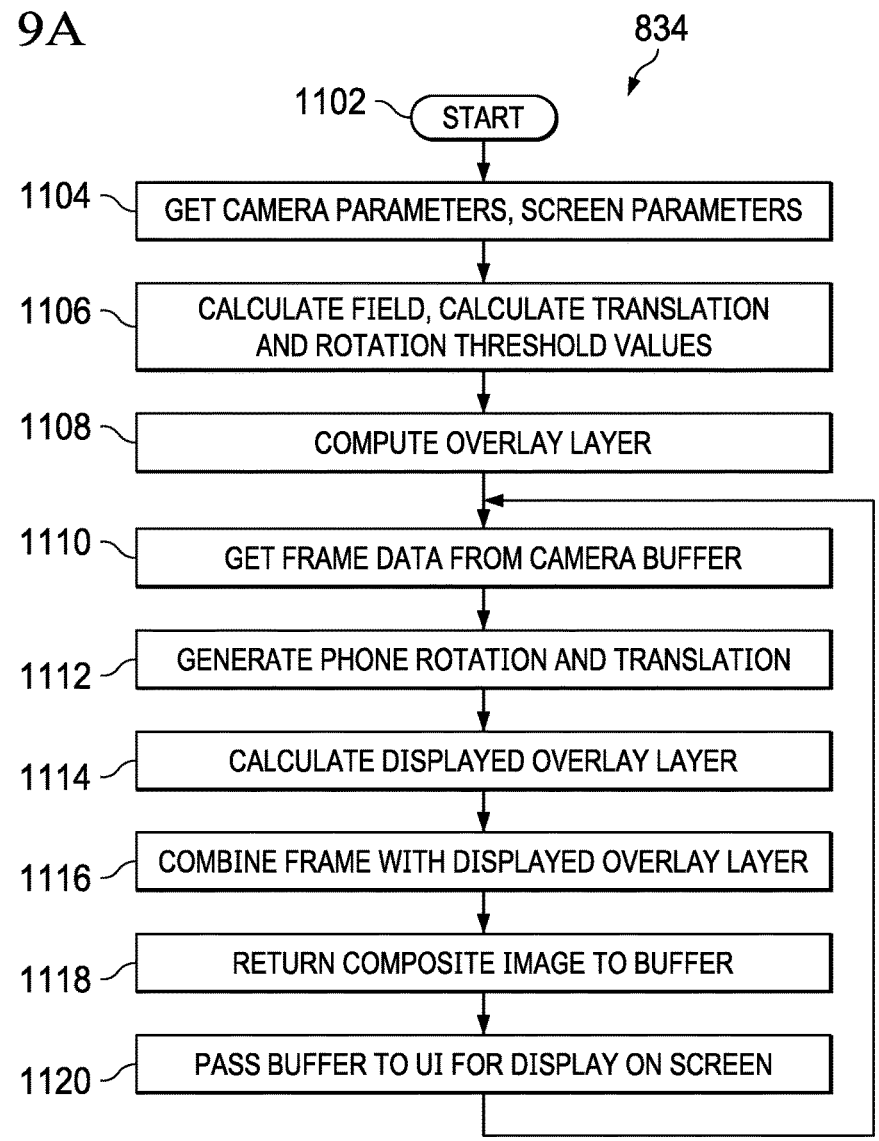

FIG. 11

```java
public class SensorActivity extends Activity implements SensorEventListener { private SensorManager mSensorManager;
    private final float[] mAccelerometerReading = new float [3];
    private final float[] mMagnetometerReading = new float[3];

private final float[] mRotationMatrix = new float[9];
    private final float[] mOrientationAngles = new float[3];

@Override
    public void onCreate(Bundle savedInstanceState) {
        super.onCreate(savedInstanceState);
        setContentView(R.layout.main);
        mSensorManager = (SensorManager) getSystemService(Context.SENSOR _SERVICE);
    }

@Override
    public void onAccuracyChanged(Sensor sensor, int accuracy) {
        // Do something here if sensor accuracy changes.
        // You must implement this callback in your code.
    }

@Override
    protected void onResume() {
        super.onResume();

// Get updates from the accelerometer and magnetometer at a constant rate.
        // To make batch operations more efficient and reduce power consumption,
        // provide support for delaying updates to the application.
        //
        // In this example, the sensor reporting delay is small enough such that
        // the application receives an update before the system checks the sensor
        // readings again.
        mSensorManager.registerListener(this, Sensor.TYPE_ACCELEROMETER,
            SensorManager.SENSOR_DELAY_NORMAL,
SensorManager.SENSOR_DELAY_UI);
        mSensorManager.registerListener(this, Sensor.TYPE_MAGNETIC_FIELD,
            SensorManager.SENSOR_DELAY_NORMAL,
SensorManager.SENSOR _DELAY_UI);
    }
```

FIG. 10A

```
@Override
protected void onPause() {
    super.onPause();

// Don't receive any more updates from either sensor.
    mSensorManager.unregisterListener(this);
}

// Get readings from accelerometer and magnetometer. To simplify calculations,
// consider storing these readings as unit vectors.
@Override
public void onSensorChanged(SensorEvent event) {
    if (event.sensor == Sensor.TYPE_ACCELEROMETER) {
        System.arraycopy(event.values, 0, mAccelerometerReading,
            0, mAccelerometerReading.length);
    }
    else if (event.sensor == Sensor.TYPE_MAGNETIC_FIELD) {
        System.arraycopy(event.values, 0, mMagnetometerReading,
            0, mMagnetometerReading.length);
    }
}

// Compute the three orientation angles based on the most recent readings from
// the device's accelerometer and magnetometer.
public void updateOrientationAngles() {
  // Update rotation matrix, which is needed to update orientation angles.
  mSensorManager.getRotationMatrix(mRotationMatrix, null,
        mAccelerometerReading, mMagnetometerReading);

// "mRotationMatrix" now has up-to-date information.

mSensorManager.getOrientation(mRotationMatrix, mOrientationAngles);

// "mOrientationAngles" now has up-to-date information.
  }
}
```

FIG. 10B

```
1   import numpy as np #advanced mathematical functions needed for neural network
2
3   # X = plant factors (hours of sunlight, high temperature, low temperature, avg # freezes, soil density,
4   #soil pH, soil salinity, precipitation, water pH, water salinity), y = plant score
5   xAll= np.array(([2, 95, 28, 14, 3, 4.2, 3, 15, 3.4, 7], [1, 85, 8, 23, 4, 3.9, 9, 6, 2.1, 15], [3, 88,
6   28, 14, 3, 4.2, 3, 15, 5.9, 2], [9, 80, 14, 36, 6, 7.4, 6, 8, 1.9, 12]), dtype=float) # input data
7   y = np.array(([10], [3], [7]), dtype=float) # output
8
9   # scale units
10  xAll = xAll/np.amax(xAll, axis=0) # scaling input data
11  y = y/10 # scaling output data (max plant score is 10)
12
13  # split data
14  X = np.split(xAll, [3])[0] # training data
15  xPredicted= np.split(xAll, [3])[1] # testing data
16
17  # Create neural network
18  class Neural_Network(object):
19  def __init__(self):
20  #parameters for size of neural network, more hidden layers for deeper learning
21  self.inputSize= 10 # input 10 plant factors
22  self.outputSize = 1 # output one plant score for each set of factors
23  self.hiddenSize= 11 # 11 weighted nodes
24
25  #weights
26  self.W1 = np.random.randn(self.inputSize, self.hiddenSize) # (11x10) weight to hidden
27  self.W2 = np.random.randn(self.hiddenSize, self.outputSize) # (11x1) weight to output
28
29  #forward propagation through our network
30  def forward(self, X):
31  self.z= np.dot(X, self.W1) # Step 2808 calculate dot product of input and first set of weights
32  self.z2 = self.sigmoid(self.z) # Step 2810 apply activation function
33  self.z3 = np.dot(self.z2, self.W2) # Step 2812 calculate dot product of hidden second set of weights
34  o = self.sigmoid(self.z3) # Step 2814 apply final activation function
35  return o # return prediction
36  # activation function
37  def sigmoid(self, s):
38  return 1/(1+np.exp(-s))
39
40  #derivative of sigmoid
41  def sigmoidPrime(self, s):
42  return s * (1 -s)
43
```

FIG. 29A

```
44  # backward propagate through the network to train
45  def backward(self, X, y, o):
46    self.o_error= y -o # Step 2830 error in output
47    self.o_delta= self.o_error*self.sigmoidPrime(o) # step 2832 apply sigmoid derivative to error
48  # step 2834 hidden error: how much our hidden layer weights contributed to output error
49  self.z2_error = self.o_delta.dot(self.W2.T)
50  # step 2836 apply sigmoid derivative to hidden error
51    self.z2_delta = self.z2_error*self.sigmoidPrime(self.z2)
52    self.W1 += X.T.dot(self.z2_delta) # step 2838 adjust first set weights (input to hidden)
53    self.W2 += self.z2.T.dot(self.o_delta) # step 2840 adjust second set weights (hidden to output)
54
55  #create output in forward propagation and use backward propagation to train system
56    def train(self, X, y):
57    o = self.forward(X)
58    self.backward(X, y, o)
59
60  # save weights
61  def saveWeights(self):
62    np.savetxt("w1.txt", self.W1, fmt="%s")
63    np.savetxt("w2.txt", self.W2, fmt="%s")
64
65  #prints predicted output after training
66  def predict(self):
67    print ("Predicted data based on trained weights: ");
68    print ("Input (scaled): \n" + str(xPredicted));
69    print ("Output: \n" + str(self.forward(xPredicted)));
70
71  #run neural network
72  NN = Neural_Network()
73  Loss = str(np.mean(np.square(NN.forward(X) -y))) #mean sum squared loss
74  IdealLoss = str(.00001)
75  for i in range(150000):# trains the NN 150,000 times or until loss reaches an ideal loss value
76  if Loss > IdealLoss:
77    print ("# " + str(i) + "\n")
78    print ("Input (scaled): \n" + str(X))
79    print ("Actual Output: \n" + str(y))
80    print ("Predicted Output: \n" + str(NN.forward(X)))
81    print ("Loss: \n" + Loss)
82    print ("\n")
83    NN.train(X, y);
84  else: break #if ideal loss is achieved  training ends to reduce computational expense
85
86  NN.saveWeights() #saves optimum weights after training
87  NN.predict() #runs a prediction after training
```

FIG. 29B

SYSTEM AND METHOD FOR HORTICULTURE VIABILITY PREDICTION AND DISPLAY

CROSS-REFERENCE TO RELATED APPLICATIONS

This application claims priority benefit from U.S. Provisional Application No. 62/704,344 filed on May 5, 2020. The patent application identified above is incorporated herein by reference in its entirety to provide continuity of disclosure.

FIELD OF THE INVENTION

The present invention relates to plant maintenance, identification, and viability scoring.

BACKGROUND OF THE INVENTION

People love plants. And as humans we need plants to live—oxygen, food, medicine, lumber and a host of other by products. Residential gardeners of all experience levels struggle with growing plants successfully. The problem is a lack of localized specific information. There are many variables that contribute to the success or failure of gardening, including but not limited to first and last freeze dates, daily average temperature, daily high temperature, daily low temperature, extreme heat, extreme heat days, deep freeze days, total sunlight (hours per day), soil type (sand, clay, loam, mix), soil pH, water salinity, water chemistry (general—excellent to poor), average monthly precipitation, daily precipitation, fertilizer (type and frequency), plant stage of life, pruning, pests, disease, plant genetics and wind among other variables.

Publicly available sources of information are rarely localized such that they consider the climatic and environmental specificity of where the plants are planted. For example, the sunlight and water requirements of a plant species in Oregon are vastly different than that of the same species in Texas. Historically, hard earned experience, education and knowledge of Master Gardeners is the only place to look for guidance. Similarly, in some areas local resources exist where gardeners may communicate with one another about pest infestations and share general tips for the area. However, none of these sources predict a plant's viability based on detailed and localized yard analysis, such as soil and water chemistry. Furthermore, existing resources cannot tailor plant care instructions and tips to a localized yard and do not provide a means of viewing a selected plant in a specified location.

As a result, there exists a need in the art for a means of predicting plant viability, providing yard specific care instructions, and providing an augmented reality image of a plant in a specified location.

SUMMARY OF THE INVENTION

The invention solves the "art vs science" dilemma by aggregating and localizing optimal and trended and current actual contributing climatic, environmental and plant-specific variables by starting with a fundamental value—the precise location of the plant. Once the location is understood, the invention connects to telemetry-driven weather stations including NOAA or private collection points to understand historical climatic data including temperatures, precipitation and wind.

Based on the "Average Last Freeze Date" for a given location, the invention adds 15 days which becomes the "Begin Season" period. The date certain upon which Begin Season ends may vary by geography as we collect global information and the system, using artificial intelligence and algorithms, begins to understand growing trends. Begin Season is the period of the year where beds and yards are prepared for gardening and early planting begins for selected plant categories. It is also when early season pruning happens. The end of Begin Season is the start of "In Season". The invention, driven by rules based on each plant category and the current season, creates and presents care tasks to the user dynamically for each plant in their yard based on what category the plant is a part of such as cacti/succulents, perennials, shrubs, ornamental grass, etc. As tasks are completed, the invention looks to the rule set to dynamically generate the next care task based on the completion date of the current task and the rule's recurrence value such as "every 3 months", "1 time per week" or "1 time per year". Rules are built by season (Begin Season, In Season, End Season, Off Season, Extreme Heat) for care categories including planting, pruning, sunlight, fertilizer, watering, pest, freeze and general. Care tasks can either be tips (informational only) or tasks requiring the user to do something. Tasks can be completed, suspended, skipped or deleted. If a task is deleted it will never be seen again. Selection and application of a task status other than "delete" will cause the invention to look to the rule set to generate the next task to be performed. Care tasks include care tips and content that explain what and how to perform the task. Care tip content is delivered both for the plant category as well as the specific plant species or variety. In addition to the system generated tasks, manual tasks can be created by the user.

If a plant is located in an "Extreme Heat Zone" then the "Extreme Heat" season will start approximately 90 days from the Average Last Freeze Date and will extend until 90 days before the Average First Freeze Date. Extreme Heat Care Tasks supersede In Season rules. These start and end periods may change over time and based on geography as the system collects and synthesizes climatic trends globally.

At 16 days before the "Average First Freeze Date" as collected from the nearest weather station for the precise location of the yard, In Season ends and "End of Season" begins and goes until the "Average First Freeze Date", during which time plants are prepared for winter. Upon the Average First Freeze Date starts the period where plants over-winter, also known as "Off Season" in the invention. Off Season continues until the Average Last Freeze Date upon which Begin Season starts again.

In addition to rules-based Care Tasks and tips, the invention can send out situational alerts based on the plants in a yard. For instance, a message can be sent to warn of a pending freeze that can affect plants which are not freeze tolerant. It can also warn of pest or disease outbreak seen in a specific geography based on care trends seen in the invention across the localized user base.

The invention evaluates collected data values from climatic and environmental telemetry and systems as well as user input based on the precise location of the plant, such as soil and water chemistry, and compares that to optimum values for the specific plant and plant category and grades each to produce a score. Most of these variables can be measured and aggregated as logarithmic values ranging from good to bad based on the known optimum values for the plant species (or even sub-species/variety). The individual values are used to train a neural network to predict a viability value which represents a "Viability Score" or the probability of success with the specific plant under the exact conditions the plant is growing.

Viability Scoring can be used retroactively to score existing plants or proactively to help select plants with high probability of growing success. In addition, the invention can also show trends based on geography of the frequency of the exact plant in other yards. This implies that other gardeners are having success growing the plant.

For retroactive scoring, a user may either select the plant type or upload an image of the plant. The invention can identify a plant type using image recognition. The system inputs the optimal climactic and environmental values for the plant type identified and the actual values in the plant location in a neural network to derive a viability score. The system may also be capable of using image recognition to evaluate the condition of the plant, such as age and pest infestation through artificial neural network, which may affect the viability score and suggested care tips.

For proactive scoring, a user may select a desired plant type and location in the user's yard. The invention will derive a viability score. Optionally, the user may also view an augmented reality image of a selected plant in a desired location. The image projection may be adjusted by the system based on a predicted viability score.

BRIEF DESCRIPTION OF THE DRAWINGS

In the detailed description of the preferred embodiments presented below, reference is made to the accompanying drawings.

FIG. 8B is a method of generating and displaying augmented reality content in a preferred embodiment.

FIG. 9A is exemplary code for determining device rotation.

FIGS. 10A and 10B are source code for a track movement subroutine.

FIG. 11 is a method of generating and translating augmented reality content.

FIGS. 29A and 29B is a preferred implementation of a preferred embodiment of a neural network.

DETAILED DESCRIPTION OF THE INVENTION

Figure 1:
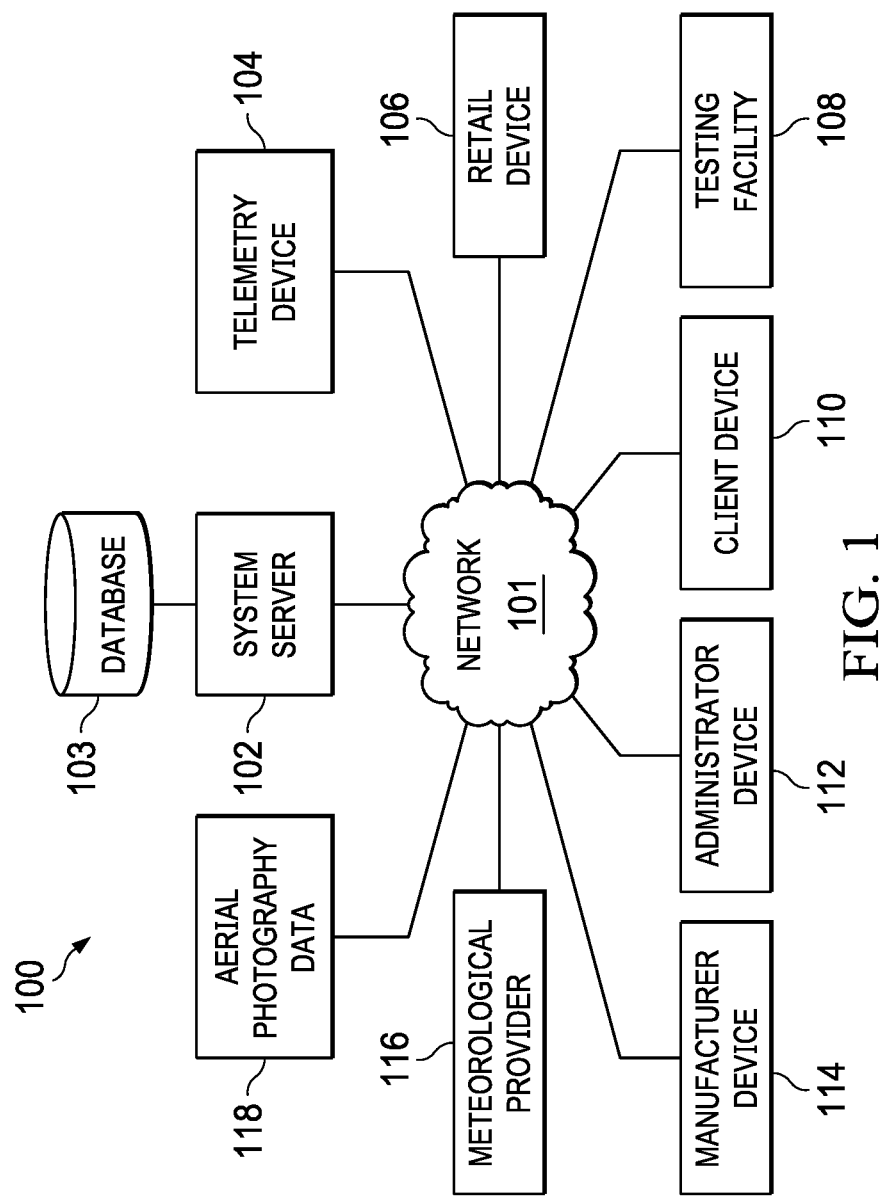
FIG. 1 is a network diagram of a preferred embodiment of a system for plant maintenance and scoring.

Referring to FIG. 1, network architecture 100 of a preferred embodiment will be described.

System server 102 is operatively connected to database memory 103. The system server is connected to network 101. Network 101 is a wide area network, such as the internet. System server 102 is also connected to manufacturer device 114, retail device 106, administrator device 112, and client device 110 through network 101. In a preferred embodiment, meteorological data provider device 116 and telemetry device 104 are also connected to administrator device 112 and system server 102 through network 101. Aerial data provider device 118, testing facility device 108, and various additional telemetry devices are also connected to the network.

In a preferred embodiment, meteorological data is provided by the National Oceanic and Atmospheric Association ("NOAA") of the United States.

In a preferred embodiment, telemetry device 104 is a physical data collection device which has a moisture sensor, a light meter, and/or a pH sensor.

In a preferred embodiment, administrator device 112 orchestrates collection of data from manufacturer device 114, meteorological data provider device 116, telemetry device 104, and retail device 106 to aid the system server in providing it to the client device, as will be further described.

Figure 2:
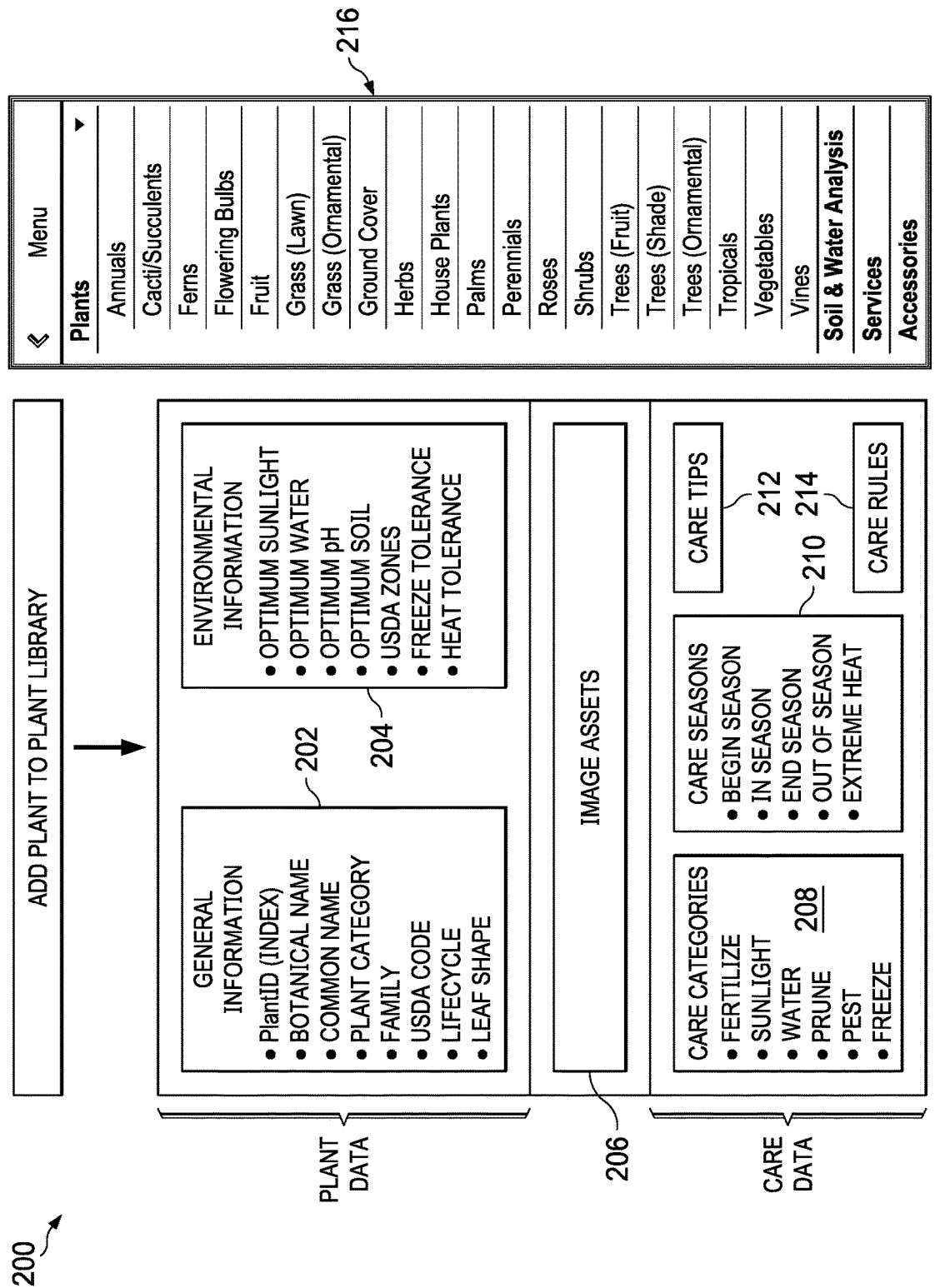
FIG. 2 is a diagram of database organization for a preferred embodiment.

Referring to FIG. 2, organization of database 200 for a preferred embodiment will be described. Plant information is indexed according to plant ID. For each plant ID, general information is stored in table 202 such as a botanical name, common name, plant category, family, USDA code, life cycle and leaf shape. For each plant ID, environmental information is also stored in table 204 of the database, such as optimum sunlight, optimum water, optimum pH, optimum soil, USDA zones, freeze tolerance and heat tolerance. For each plant ID, one or more plant images will be stored as an image asset in section 206. Additionally, for each plant ID, care data is stored in table 208, such as ideal fertilizer, sunlight, water, pruning and pest control are stored. Likewise, care season is stored in table 210, such as begin season, end season, in season and out of season and extreme heat values are also stored according to plant category. Care tips and care rules are also stored according to plant category in tables 212 and 214, respectively.

By associating a plant with a plant category, care protocols for that plant category are assumed by the plant. This establishes optimum values for the plant species. Higher levels of precision may be introduced at the plant level that supersede or augment the category protocol.

The system creates and administrates recurring care tasks for plants to help gardeners care for their plants based on their geography.

Inputs include, but are not limited to, the following: Geo-location of yard based on address; Climate Data based on geo-location of yard; Plant species with profile data; Plant Category of Species (from plant profile); and season calculations.

Climate Data based on geo-location of yard (NOAA) is based on the address of the PT user's yard. Historical and current data are pulled from the closest NOAA weather station, including: Average Last Freeze Date; Average First Freeze Date; Average monthly high temp; Average monthly precipitation; Actual recent precipitation; and Forecast precipitation.

Season calculations for a user's yard geo-location are: Begin Season=Average Last Freeze Date to +15 days (this value can be configurable); End Season=Average First Freeze Date to −15 days (this value can be configurable); In Season=End of Begin Season to beginning of End Season; Off Season=Average First Freeze Date to Average Last Freeze Date; Extreme Heat Zone=any geo-location where the monthly average daily mean temp is >90° F. (this value can be configurable); and Extreme Heat Season=for months where Extreme Heat Zone is valid (see rules above).

Care tips content is built for each Plant Category (Annual; Aquatic; Cacti/Succulent; Cannabis; Fern; Flowering Bulb; Grass (Lawn); Grass (Ornamental); Ground Cover; Herb; House Plant; Palm; Perennial; Rose; Shrub; Tree (Fruit); Tree (Ornamental); Tree (Shade); Tropical; Vegetable & Fruit; Vine). Plant Categories can be added as needed.

Each plant detail profile (species) may have care tips specific to the plant species and for the geography of the yard location for planting, fertilizing, pruning, sunlight, watering, disease and pests.

Care Tasks are configured at the plant category level and include the following care types: planting, sunlight, watering, pruning, fertilizer (general), fertilizer (granular), fertilizer (liquid), fertilizer (slow release), pest, freeze care, general tip. Not every care type for the plant category will have a care tip or a care task.

Care tasks are setup as one time or recurring tasks and can recur based on yearly, monthly, weekly or daily values.

Care task rules are specific to a season (Begin Season, In Season, End Season, Off Season, Extreme Heat) and their recurrence ends regardless of the rule at the end of the season. For instance, if a care task rule was setup for Grass (Lawn) that recurred weekly it would stop at the end of the In Season period.

Actions available on System generated Care Tasks are "Completed" with a completion date, "Pending", "Suspended", "Skip" or "Delete". System care tasks cannot be modified.

Once a system care task has been marked as 'Completed', the system records the completion event and then looks to the task's recurrence rule (if any) to calculate the next time the care task needs to be performed and adds that to the task queue. The user can choose how far in advance the view of care tasks is presented.

User Defined Tasks can be manually created by a user with recurrence rules and task description notes. These behave the same as system tasks except that they can also be deleted and modified by the creating user.

A user can view general information, environmental information, exemplary images, care categories, care seasons, care tips, and rules for each plant ID by selecting the plant category and type through menu 216.

Figure 3:
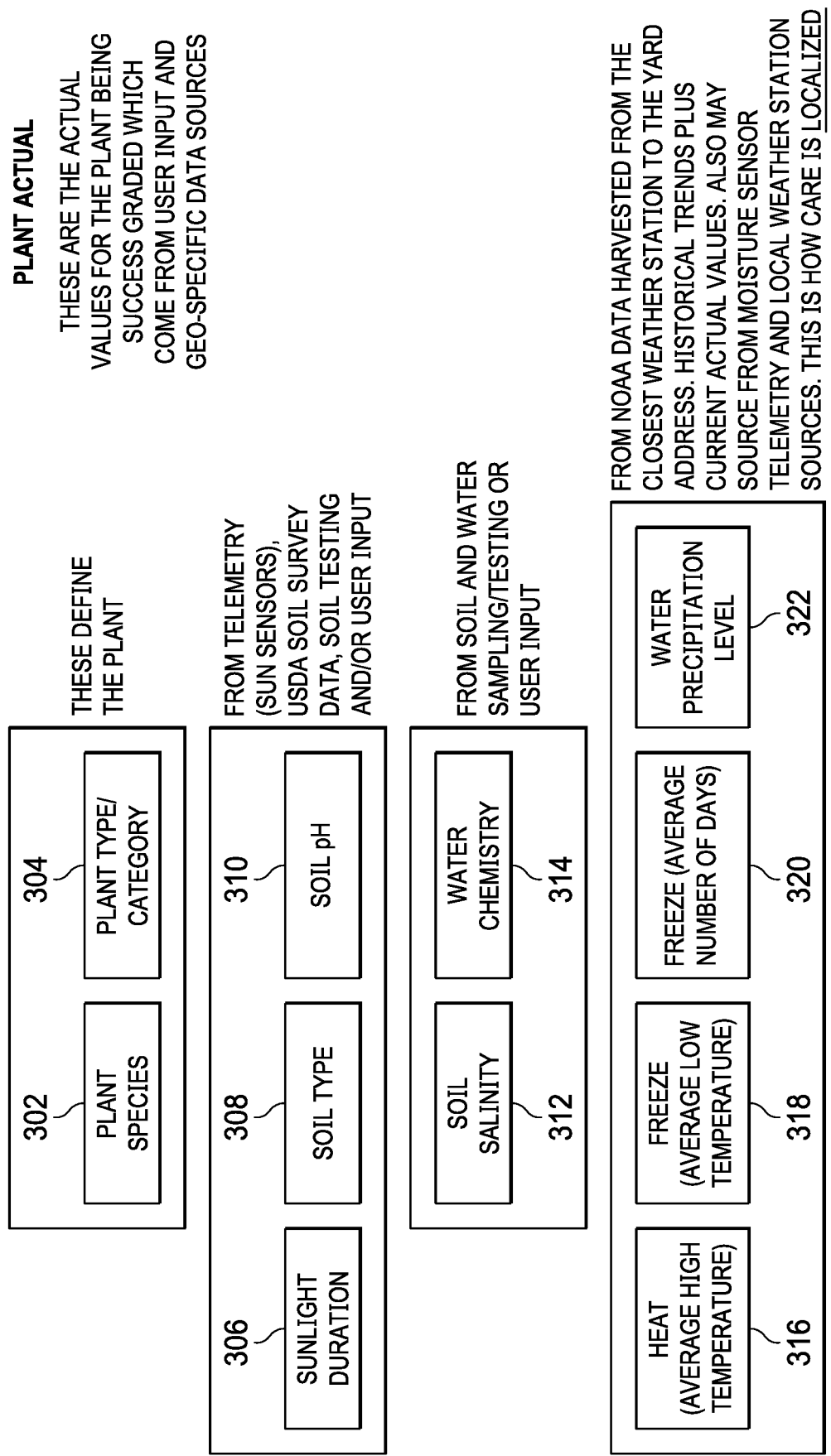
FIG. 3 is a diagram of actual plant values stored in a preferred embodiment.

Referring then to FIG. 3, the data structure for an actual planted plant record will be described. Each plant will have a plant type value, identified in the database, that includes the actual values for the plant being graded for viability which come from user input and geo-specific data sources. For example, each actual plant record will include plant species 302 and plant type/category 304 which will define the plant type. Each plant record will include actual sunlight duration value 306, soil type value 308, and soil pH value 310 which is derived from telemetry, USDA soil survey data, soil testing and user input. Light and pH sensors can also be used to derive sunlight duration and soil pH data for the placement of the plant, as will be further described. Each plant actual record will include soil salinity 312 and water chemistry data field 314. The soil salinity and water chemistry data will be drawn from soil and water sampling and testing, or user input.

Each plant's actual record will further include average high temperature record 316, average low temperature record 318, average number of freeze dates 320, and water precipitation level record 322. This data will be drawn from NOAA data collected from the NOAA weather station closest to the location of the yard. Water precipitation level can be drawn from moisture sensor telemetry and local weather station sources. Average high temperature, average low temperature and average freeze days are also available from historical trends and updated current actual values.

Figure 4:
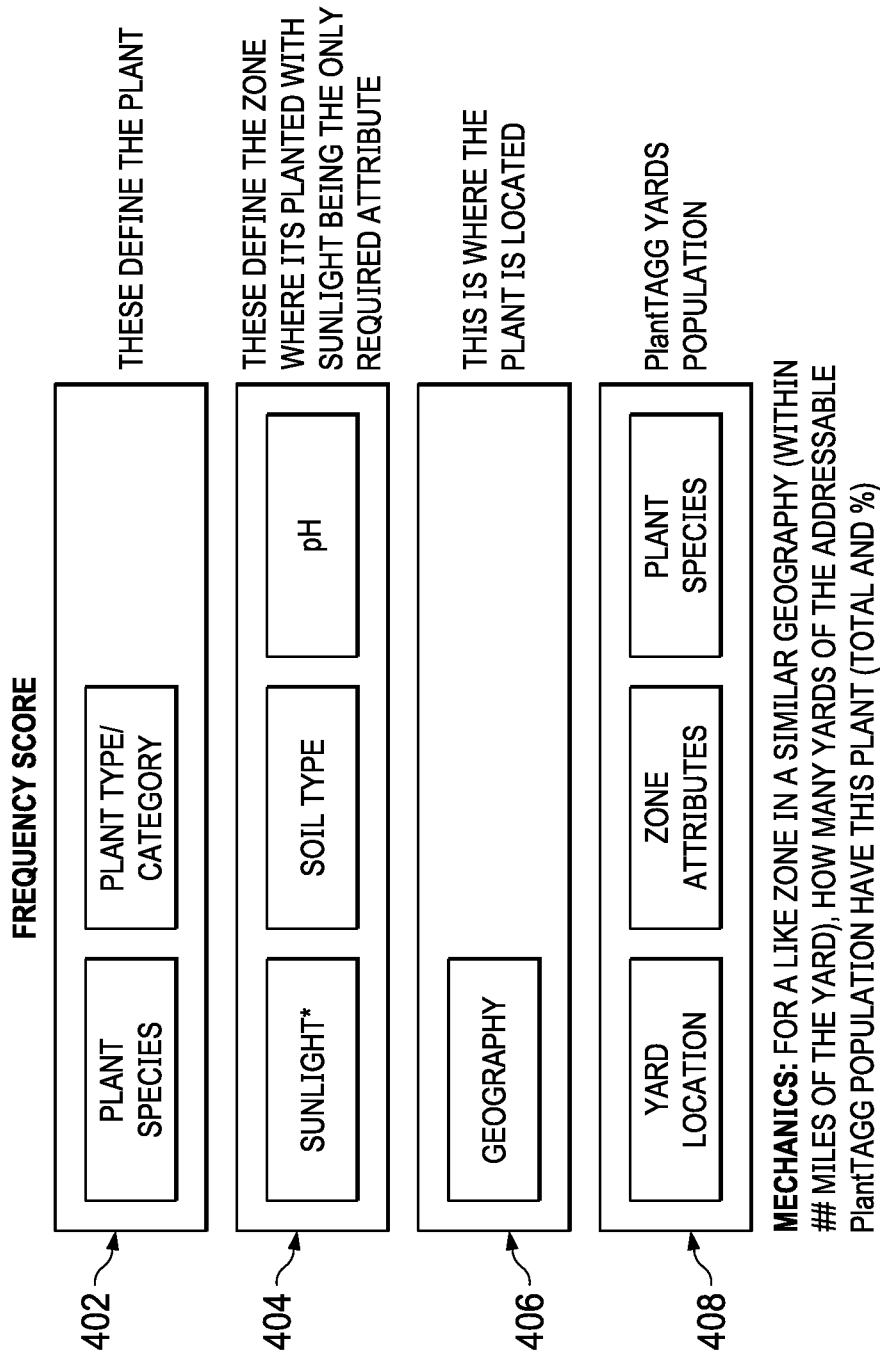
FIG. 4 is a diagram of frequency scoring for a preferred embodiment.

Referring to FIG. 4, the frequency score record for each plant 402 will be described. The frequency score includes zone data 404 which defines where the plant is planted including sunlight, soil type and pH. Sunlight is the only zone attribute required to produce a frequency score. The record also includes geography 406, where the plant is located, along with yard population 408. Yard population 408 includes the yard location, the zone attributes, and plant species.

Figure 5:
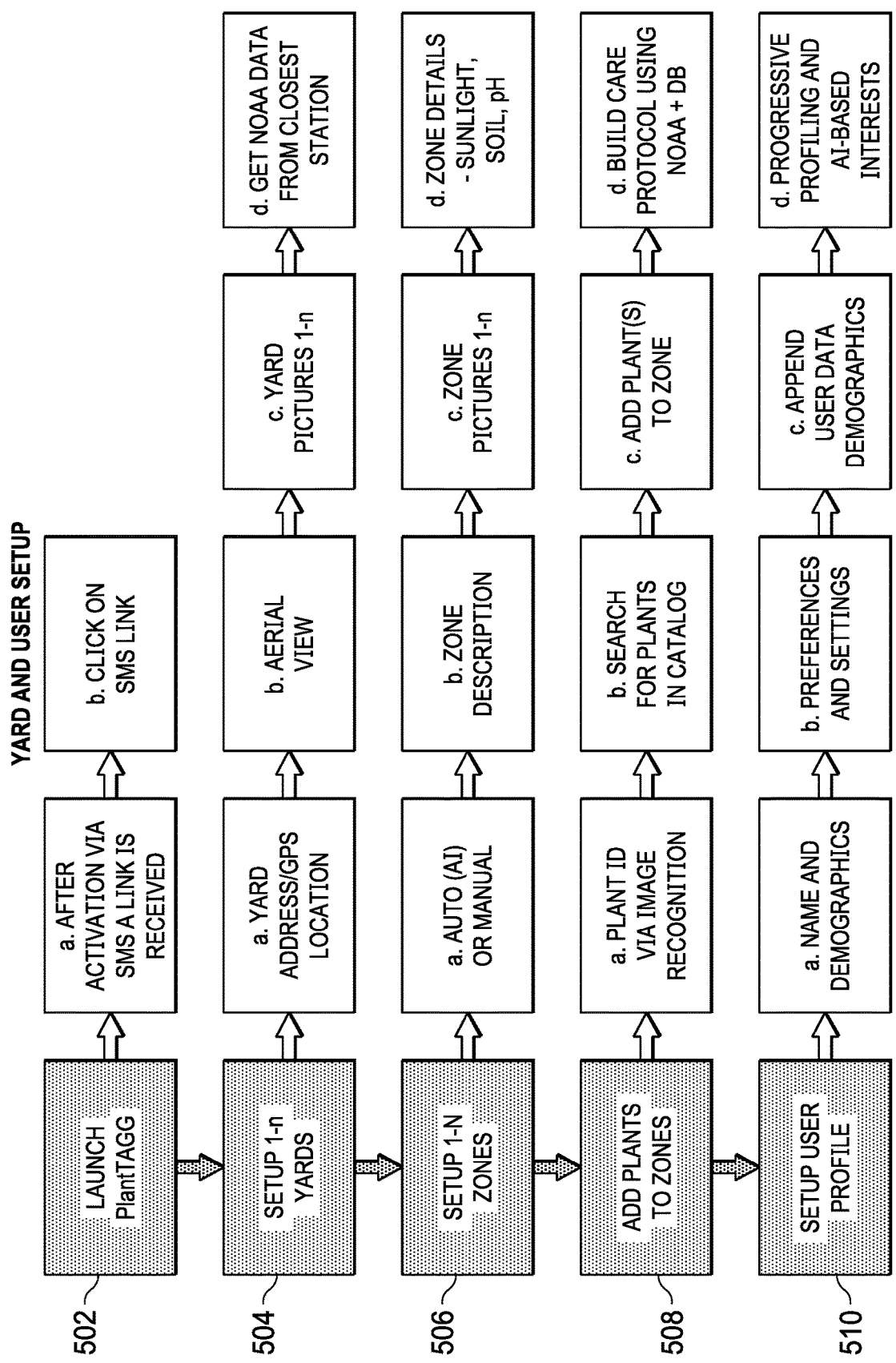
FIG. 5 is a method of data input for a user and yard in a preferred embodiment.

Referring to FIG. 5, the yard and user setup data entry routine will be described. At step 502, an app is launched on the user device. In a preferred embodiment, the app is launched via receipt of an SMS link which is then activated by the user. Once activated, the app is downloaded from the server and activated by the administrator device. All data is stored in the database.

At step 504, the yard setup is accomplished. The yard set up address includes entering an address and/or GPS location of the yard. An aerial view of the yard is then downloaded by the system and stored in the record, as will be further described. Additional user pictures of the yard are added from the user device. The system then downloads meteorological data from the closest station to the yard location.

At step 506, the yard zones data is received. The yard zones data in a preferred embodiment, is input manually by the user. In an alternate embodiment, zone recommendations can be made by the system for the most logical zone placement based on an artificially intelligent analysis of the aerial imagery in combination with the downloaded climatic data specific to the yard. The zone description is entered along with pictures of the zone and zone details such as sunlight and soil pH.

At step 508, data regarding plants which occupy the zone is entered. Data can include the plant ID which is derived through manual text search or through image recognition. If plant ID is derived via image recognition a photograph is submitted by the user and then a search is conducted by the system for plants in the catalog, as will be further described. As plants are added to the zone, the system builds a care protocol using database information and NOAA meteorological information for the zone and the plant.

At step 510, the user input is provided including the name of the user, a user picture, email address and preference settings. If available in other third-party data systems, demographic and psychographic profile data are appended to the user record.

Figure 6:
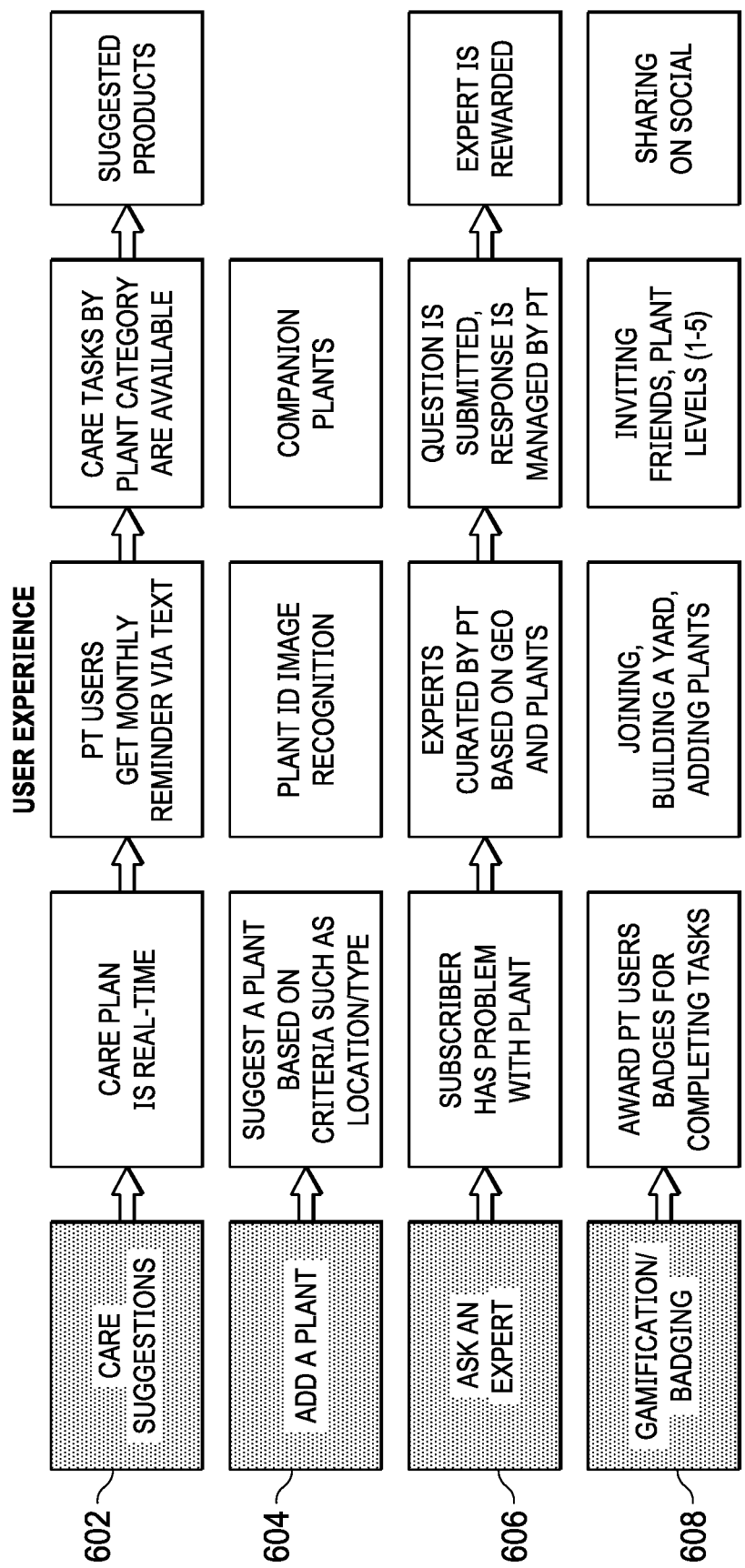
FIG. 6 is a diagram of available functions in the system.

Referring to FIG. 6, the steady state operation of the system will be described. During steady state operation of the system, the user is presented care suggestions function 602, add a plant function 604, ask an expert function 606, or interactive function 608.

Care suggestions function 602 can include real time care planning, monthly reminder via text message, timely care tasks for each plant category and suggested plant care products. Care suggestions are generated based on plant ID and location and updated based on local climactic information.

Add a plant function 604 sends suggestions for various plants based on criteria such as location and plant type for the users location and zone, and includes plant ID image recognition and companion plant information. Plant ID image recognition allows a user to upload an image of a plant to be identified by the system, as will be further described.

Ask an expert function 606 is a question and answer platform whereby the user submits questions which are then forwarded by the system to the appropriate expert to derive and return an answer.

Interactive function 608 includes gaming and badging functions, such as awarding the user for completing certain tasks, such as joining and building a yard, inviting friends, and sharing the platform on social media.

Figure 7:
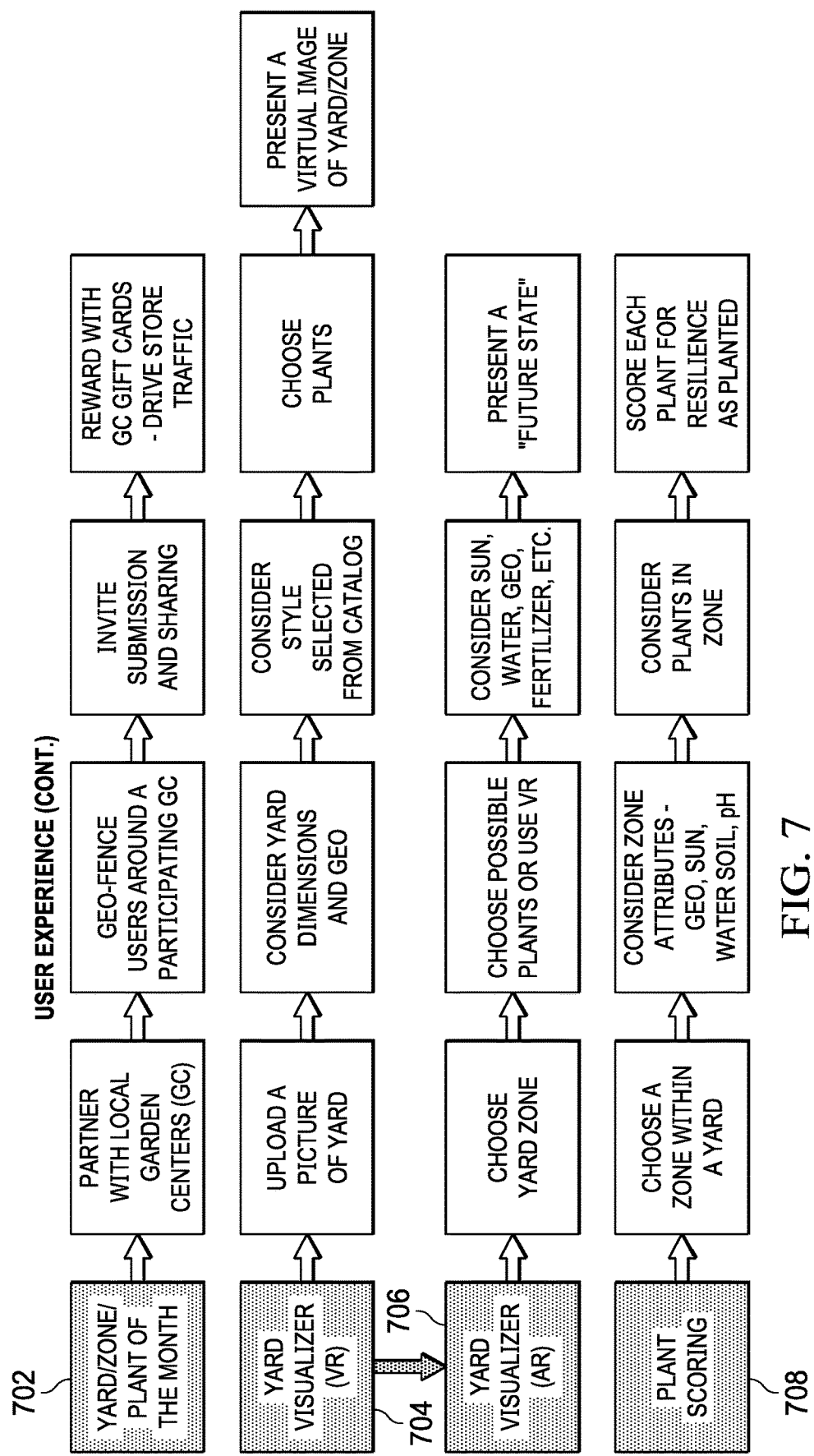
FIG. 7 is a diagram of available functions in the system.

Referring to FIG. 7, the steady state operation of the system will be further described. The user is presented with yard/zone or plant of the month function 702, yard visualizer functions 704 and 706, and plant scoring function 708. In yard/zone or plant of the month function 702, users are invited to participate with local garden centers who are geofenced around the locality of the yard. Users are also invited to share the application with contacts and offered rewards for accomplishing traffic driven to the app.

Yard visualizer function 704 allows the user to upload pictures, considering yard dimensions and geography, and considering various styles selected from a catalog, the user then is given the option of choosing a plant and receiving a virtual image of the chosen plants in the particular yard and geometry.

Yard visualizer function 706 allows the user to choose their yard and include possible plants for each zone. The hypothetical yard is then scaled considering sun, water, geography and fertilizer to present an augmented reality future state picture to the user, as will be further described.

Plant scoring function 708 allows the user to choose zones and plant ID types and then receive a score for each plant as to its likely success and viability based on zone attributes including geography, sun, water, pH and soil, as will be further described.

Figures 2, 8A:
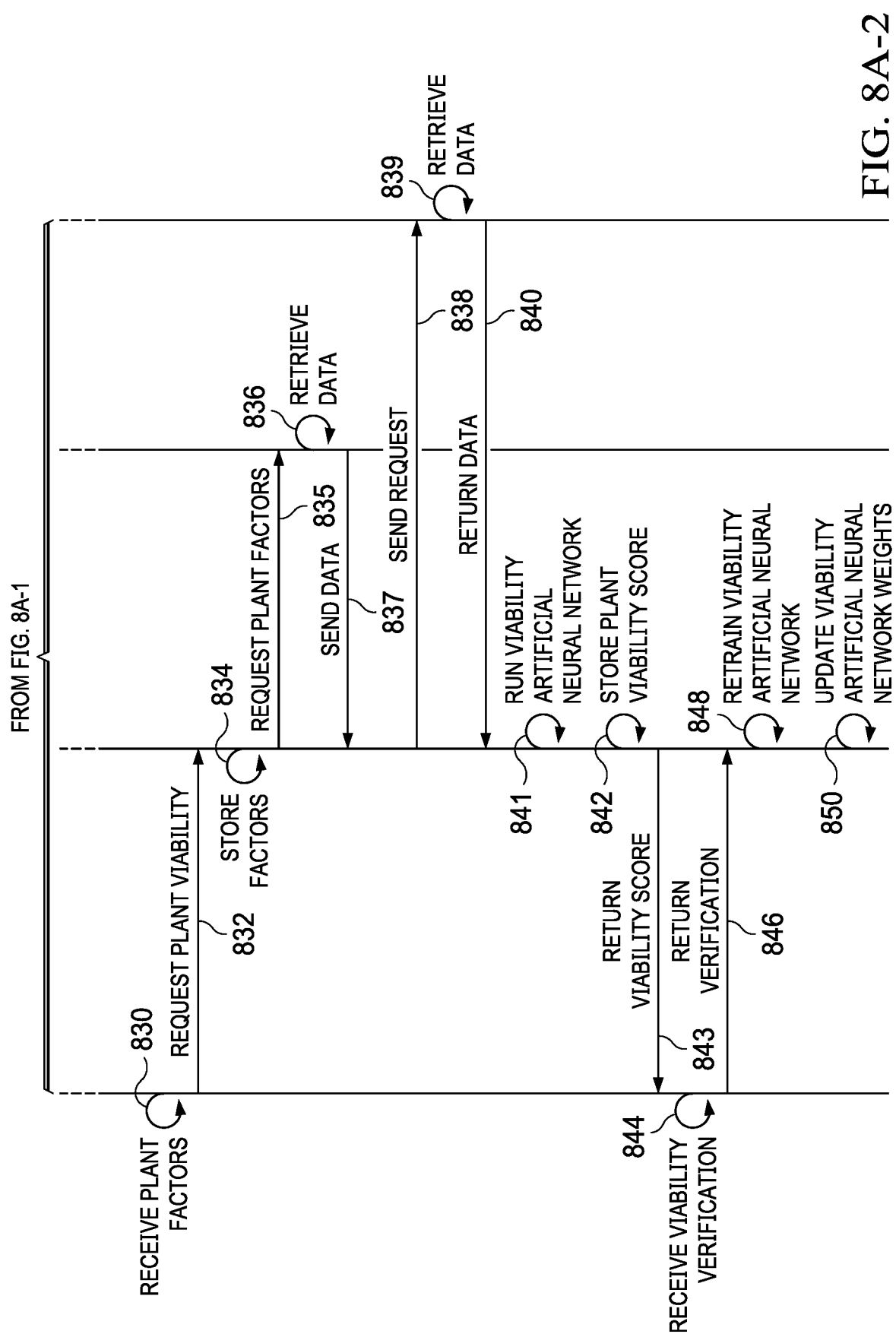
FIG. 8A is a method of requesting identification and viability prediction in a preferred embodiment.

Referring then to FIG. 8A, preferred method 800 for the plant identification and the plant scoring functions are described.

At step 802, the client device receives a selection to request a plant identification.

At step 804, the client device captures and image using the onboard camera, or an image is selected from the device memory.

At step 806, the request is forwarded to system server 102. The request includes the image. At step 808, the image is stored in the database and tagged as "add".

At step 810, the server runs the image recognition (IR) neural network to produce a plant ID prediction, as will be further described. At step 812, the plant ID prediction is stored. At step 814, the plant ID prediction is returned to the client device.

At step 816, optionally, the client device receives a verification whether or not the prediction is accurate. At step 818, the verification is returned to the server. At step 820, the server retrains the IR neural network based on the verification. In a preferred embodiment, the system may also initiate a retraining session when a set number of images are uploaded, as will be further described. At step 822, the system updates the IR neural network weights, as will be further described.

At step 824, the client device receives a selection to request a plant viability score.

At step 826, the client device receives a plant ID selection. At step 828, the client device receives a plant location. In a preferred embodiment, the plant location information includes the address, or GPS location of the plant, and the plant location in the yard. At step 830, the client device receives additional plant factors, such as number of hours the plant is in sunlight, soil type or density, and amount of water, as will be further described.

At step 832, the request is forwarded to system server 102. The request includes the plant ID, plant location information, and additional plant factors input. At step 834, the data is stored in the database.

At step 835, the server requests additional plant factors from third-party server 111, such as the average rainfall, average high temperature, soil chemistry, and average number of freeze days for the plant location, as will be further described. In one embodiment, the third-party server may be either or both testing facility device 108 and meteorological provider device 116. At step 836, the third-party server retrieves the requested data. At step 837, the requested data is sent to server 102.

In another embodiment, a telemetry device is contacted by the server to obtain moisture readings, soil pH, average temperature, sunlight readings, and plant location. At step 838, server 102 sends a request to telemetry device 104 requesting the necessary data. At step 839, the telemetry device retrieves the requested data from local memory. At step 840, telemetry device 104 returns the requested data to server 102.

At step 841, the server runs the viability neural network to produce a plant viability score, as will be further described. At step 842, the plant viability score is stored. At step 843, the plant viability score is returned to the client device.

At step 844, the client device receives a verification of the viability of the plant. At step 846, the verification is returned to the server. At step 848, the server retrains the viability neural network based on the verification. At step 850, the system updates the viability neural network weights, as will be further described.

Referring then to FIG. 8B, method 801 for the augmented reality yard visualizer function is described. At step 852, the client device obtains its GPS coordinates.

At step 854, client device 110 receives a plant type selection. In one embodiment, the plant type may be selected from a complete list of all plant IDs. In another embodiment, the plant type is selected from a selective list of plant IDs, such as plants previously selected by the user, or plants suggested by the system based on viability.

At step 856, the client device receives a selection of a desired plant zone. In a preferred embodiment, the user may select a unique position within a single plant zone.

At step 858, a desired plant age is selected for display. In a preferred embodiment, the plant ages available for virtual display varies depending on the plant type selected. For instance, bamboo could have daily, weekly, and monthly increments, whereas *magnolia* trees may only offer annual increments due to their respective growth rates.

At step 860, the client device receives a selection to virtually display the selected plant at the specified age.

At step 862, client device 110 sends a request to server 102 for augmented reality content. The request for augmented reality includes, the GPS coordinates of the client device, and the selected plant type, zone, and age.

At step 864, server 102 retrieves plant images from the database corresponding to the selected plant type and age. In a preferred embodiment, the server may also consider a pre-determined plant score in the image selection.

At step 866, the server compares the GPS coordinates of the client device with the GPS coordinates of plant zone. At step 868, server 102 scales the image based on a height d of client device 110 above the ground. In a preferred embodiment, height d is presumed to be 5 feet above the ground. In an alternate embodiment, the server may determine the height based on a reading from the altimeter built into the client device.

At step 870, server 102 generates the augmented reality content. The augmented reality content may include text, audio, video, and graphic AR images. The content may be changed to match preferences of the user, the GPS location of the client device, a plant score, plant location, the date, the time, or other factors related to the plant ID.

At step 872, server 102 sends the augmented reality content to client device 110. The augmented reality content includes overlay content and perspective content. The overlay content includes information and images that are overlaid onto an image, such as a virtual plant, settings menu, home button, and back button, or any desired plant attributes, such as plant ID, type, or score. The perspective content includes images and information that are displayed and move with respect to changes in the orientation of the display, such as the virtual plant.

At step 874, the client device activates the camera.

At step 876, client device 110 gets the next image from the live video stream from the camera.

At step 878, client device 110 gets initial physical position information related to the handheld device from the on-board sensors, as will be further described.

At step 880, client device 110 sets the initial location of the AR image at the selected location. The AR image location is fixed in memory in relation to the physical location selected. The image will only appear on screen when the camera is facing the physical position.

At step 882, the client device enters a subroutine to track the physical movement of the client device, as will be further described.

At step 884, client device 110 enters a subroutine that actively moves the AR image on the display screen to provide the illusion that the AR image is fixed in the background provided by the camera, as will be further described. Changes to the position and orientation of the client device are used to update the relative location of the perspective content as the client device is moved.

Referring to FIG. 9A, an example of C code used in a preferred embodiment to obtain sensor readings and calculate azimuth, roll, pitch, and magnetic field as required by step 828 is shown.

Figure 9B:
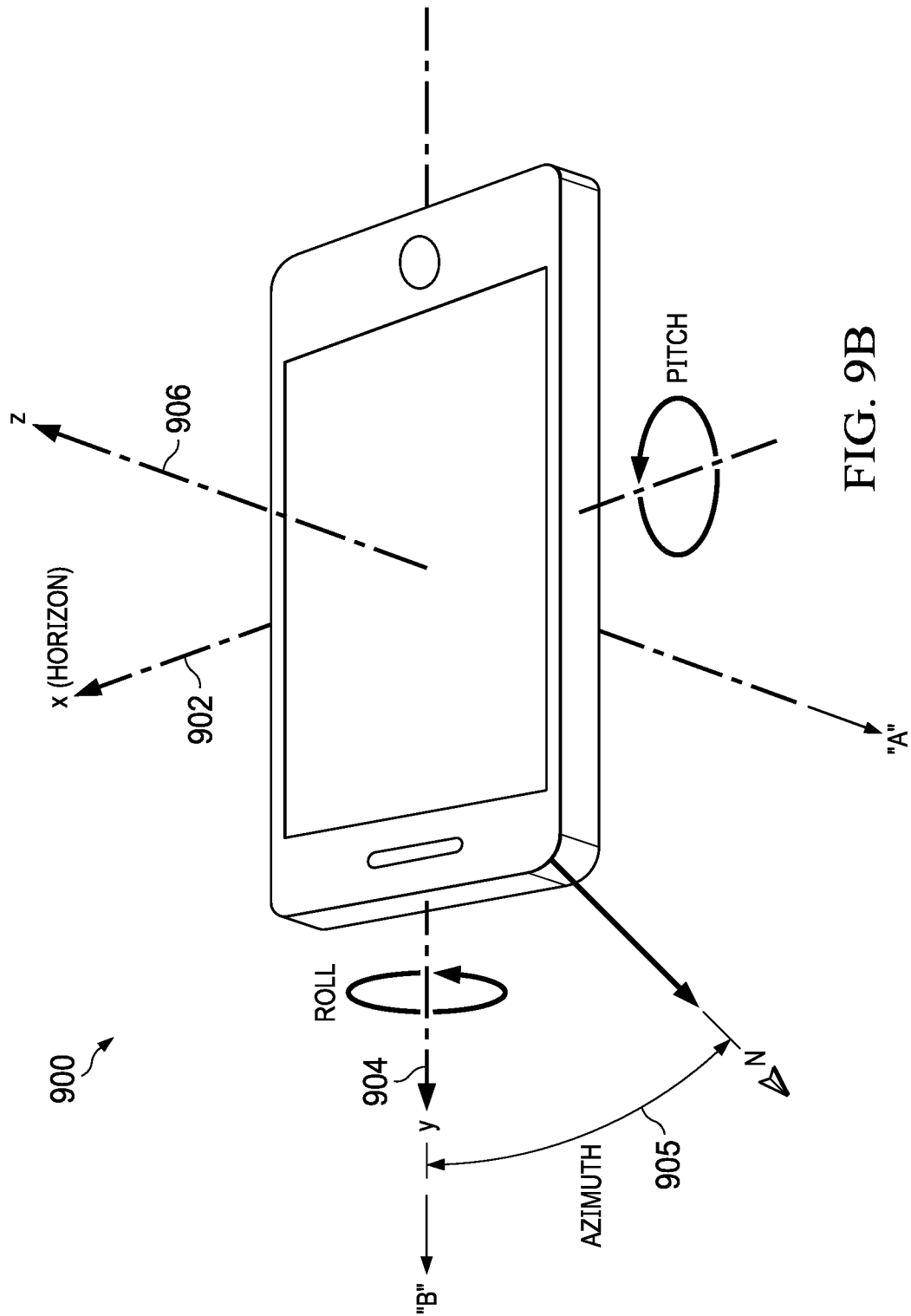
FIG. 9B is a diagram of the axes of a consumer device.

Referring to FIG. 9B, axis definitions used in a preferred embodiment are described. Coordinate system 900 for the client device will be described.

Client device 110 is shown in a position where the camera is hidden. The camera faces in the direction "−z" along axis 906 toward direction "A". In use, axis 906 is positioned to face the plant location along direction "A".

Axis 902 is the "+x" axis or "pitch". When the camera is directed toward the plant location, axis 902 is held perpendicular with the horizon. In a preferred embodiment, the roll angle should be close to 90.

Axis 904 is defined as the "+y" axis or "roll". In a preferred embodiment, the client device is in proper position in when direction "B" is exactly vertical. Hence, in a preferred embodiment the azimuth angle 905 should be close to 0.

The magnetic field and compass reading is derived about axis 904.

Referring to FIGS. 10A and 10B, an example of C code that carries out the track movement subroutine of step 832 is shown.

Referring to FIG. 11, the method used for step 834 will be further described.

At step 1102, the subroutine starts.

At step 1104, the camera field of view parameters and device screen parameters are fetched by the appropriate function calls. The angles corresponding to the camera field of view and dimensions of the device display resolution are stored in memory.

At step 1106, a field is calculated at an arbitrary distance D in front of the camera. The camera field of view vertical angle $\Theta_y$ and horizontal angle $\Theta_x$ are used to express the vertical and horizontal dimensions X and Y of the field as follows:

$$Y = 2*D*\tan(\Theta y/2) \qquad \text{Eq. 1}$$

$$X = 2*D*\tan(\Theta x/2) \qquad \text{Eq. 2}$$

After the field is calculated, the amount of translation and rotation of the field that will result in a single pixel shift, T and R, can be calculated using the device display parameters retrieved. The amount of translation representing one pixel of vertical shift is saved in memory as $T_y$, horizontal translation as $T_x$, and the amount of rotation corresponding to one pixel of shift from pitch, yaw, and roll is saved as $R_\alpha$, $R_\beta$, and $R_\gamma$.

At step 1108, the overlay layer is calculated. The overlay layer positions the overlay image in a transparent image of the same dimensions, in pixels, as the device display, and the resulting composite image is saved in memory. In a preferred embodiment, the plant size is scaled in the overlay image to be larger or smaller, depending on the distance between the client device and the selected plant location and the phone height h above the ground, before the overlay layer is saved in memory. The phone height h is presumed to be five feet above the ground. However, in an alternate embodiment an altitude reading may be retrieved from the client device to determine height.

At step 1110, the frame data from the camera buffer is fetched for editing. The function returns a bitmap from the device camera that can be altered. In one embodiment, the camera buffer is locked to prevent other threads or applications from editing the frame data.

At step 1112, the tracking subroutine generates device rotation and translation data.

At step 1114, the portion of the overlay layer to be displayed is calculated. The device rotation readings are compared to $R_\alpha$, $R_\beta$, and $R_\gamma$, and the translation readings are compared to $T_y$ and $T_x$. Rotation or translation in any dimension or direction that is less than the T and R values representing one pixel of shift are ignored. For any rotation or translation greater than a one pixel shift, the overlay layer is truncated in a given dimension by the number of pixels that have been shifted out of the field.

At step 1116, the image from the camera buffer that was returned in step 1110 is edited to form a composite image with the overlay layer. The composite image consists of the camera frame data and the displayed portion of the overlay layer combined. If the combination assigns any pixel a value from both the camera frame data and from the overlay layer, the camera frame data is ignored and the overlay layer pixel value is assigned. The resulting composite image shows the camera frame data for all transparent portions of the overlay layer and all truncated areas of the field, but the overlay image is superimposed.

At step 1118, the camera buffer is unlocked, and the composite image is returned to the buffer. At step 1120, the buffer data is passed to the UI for display on the screen. The displayed overlay layer is passed on as the new overlay layer when the function loops. The resulting image appears to superimpose a plant image, sized and scaled to match the projected plant age, for display on the image of the user environment provided by the camera. The image of the plant appears fixed in the background and maintains its placement in the background as the camera moves.

Figure 12A:
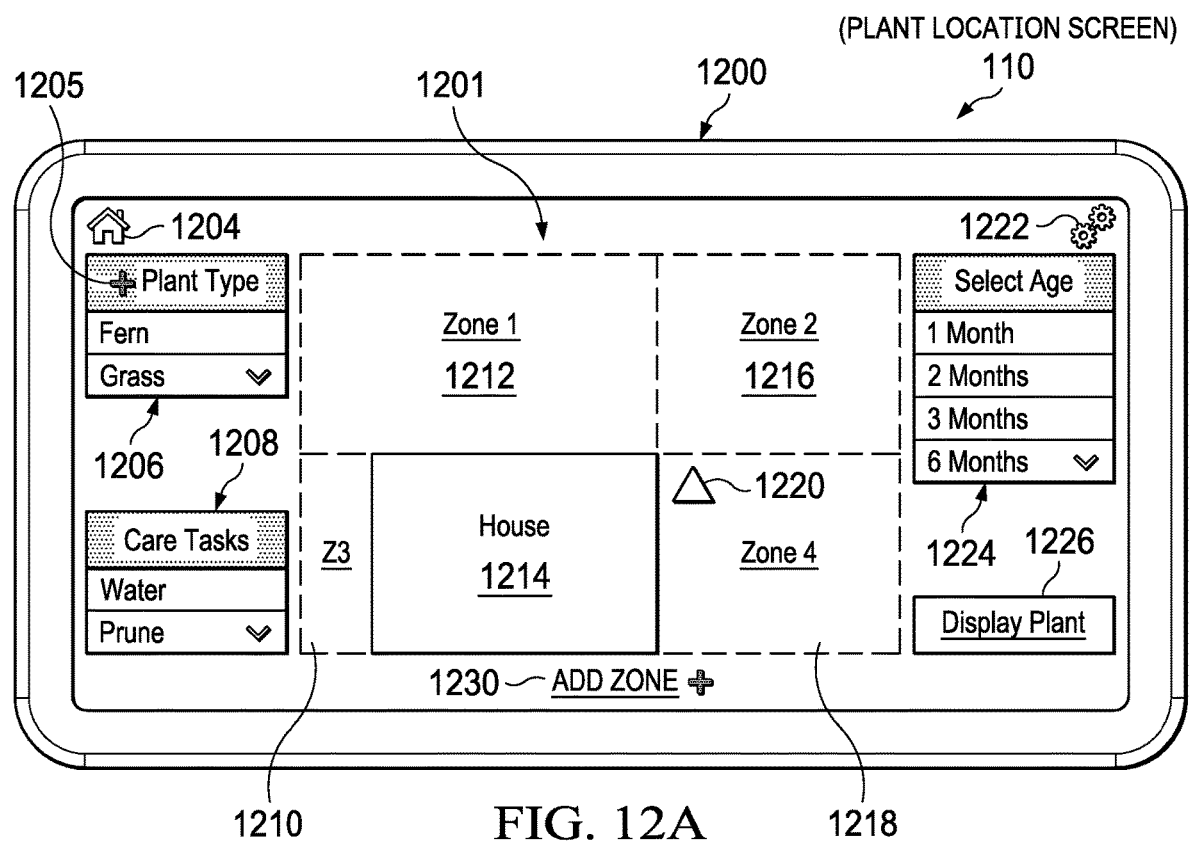
FIGS. 12A and 12B are graphic representations of a preferred user interface.

Referring to FIG. 12A, user interface 1200 will be described. User interface 1200 is displayed on a client device 110. User interface 1200 is representative of a zone management screen in a preferred embodiment. The interface includes home icon 1204 and settings icon 1222.

The zone management screen includes plan view 1201 of house 1214 and interactive zones 1210, 1212, 1216, and 1218. In a preferred embodiment, interactive zones 1210, 1212, 1216, and 1218 may reconfigured using standard press-and-hold and drag-and-drop gestures. In user interface 1200, four zones are shown, but additional zones may be added by selecting add zone button 1230.

Care task list 1208 is a drop-down list of all care tasks for the yard based on season and plant IDs. When a zone is selected, only care tasks for that particular zone are shown.

Plant list 1206 is a drop-down list of all plants located in the yard. When a zone is selected, only plants in that particular zone are shown. A selection of icon 1205 allows a user to add new plants to the yard. In a preferred embodiment, when this selection is made, a user selects a plant ID and then indicates on plan view 1201 the desired location of the plant.

For example, icon 1220 identifies the location of a new plant in Zone 4. In a preferred embodiment, when icon 1220 is selected, age list 1224 is activated. Age list 1224 is a drop-down list of available ages for an AR image based on the plant ID, as previously described. When an age is selected, display button 1226 is displayed and activated.

Figure 12B:
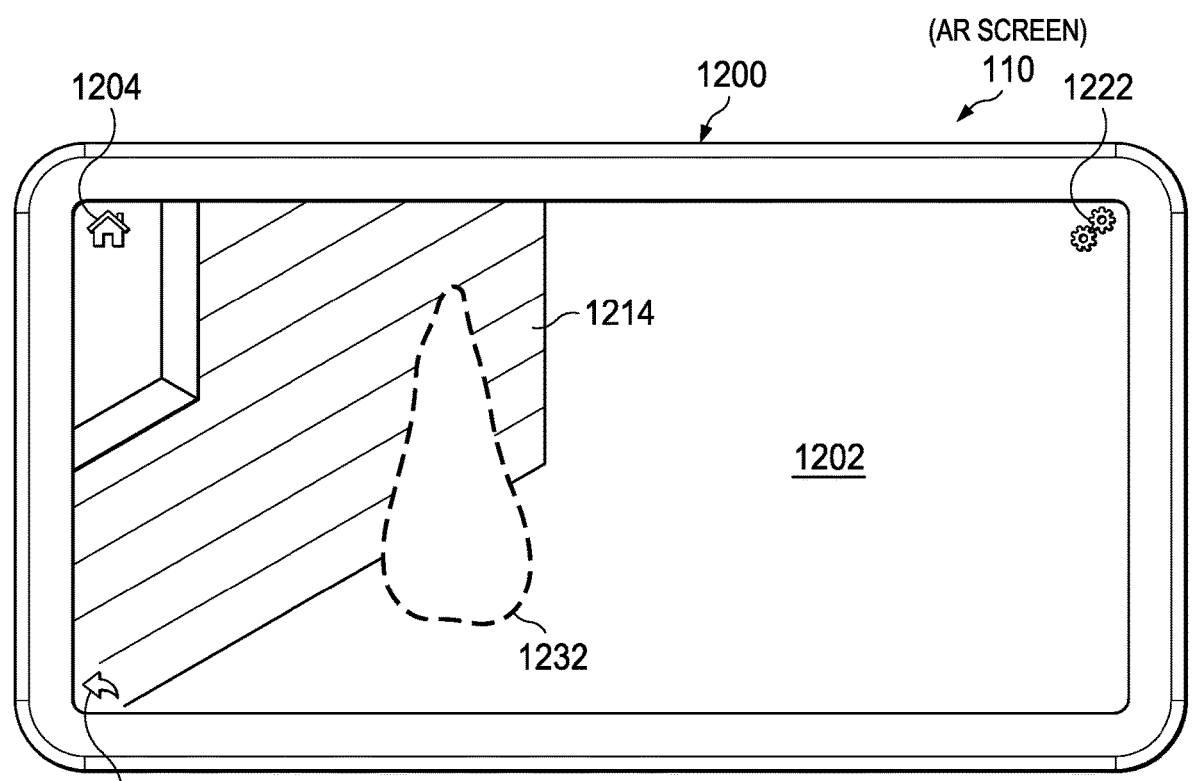

Referring to FIG. 12B, user interface 1202 is representative example of an AR plant display in a preferred embodiment. User interface 1202 includes home icon 1204, settings icon 1222, back icon 1228, and AR plant projection 1232. AR plant projection 1232 is located next to house 1214 as indicated by icon 1220. Optionally, user interface 1202 may include additional content in the overlay, such as plant type, selected age, plant score, care tasks, or other features, such as related advertising. As the camera is moved, the plant display remains fixed relative to the background, providing an illusion that the plant is fixed in the yard.

Figure 13:
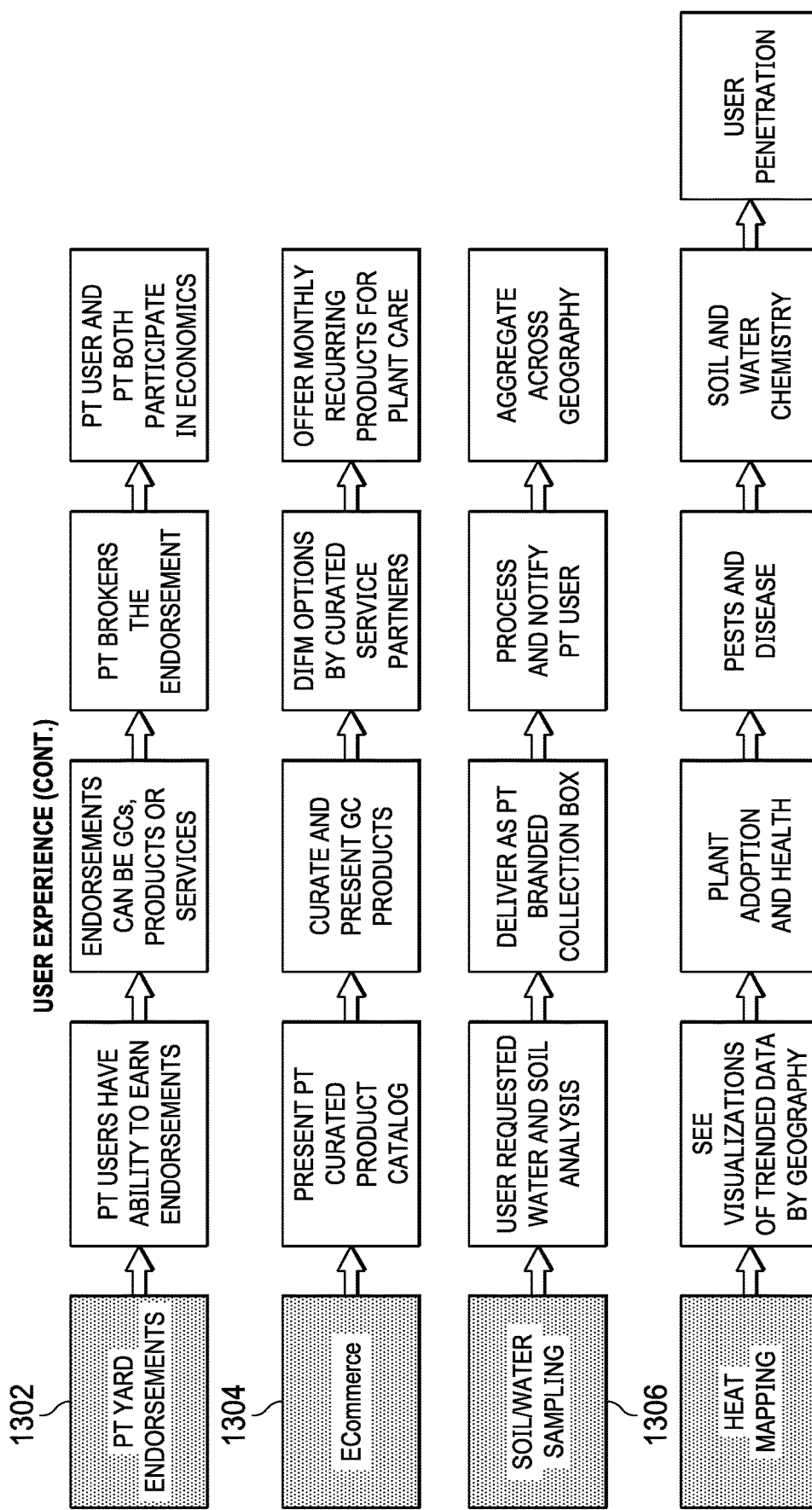
FIG. 13 is a diagram of available functions in the system.

Referring to FIG. 13, the user experience is further described. The user is presented with yard endorsements function 1302, ecommerce function 1304, soil and water sampling function 1306, and heat mapping function 1308. For yard endorsements function 1302, the system brokers endorsement from the user to participate in order to allow and enable rewards.

Ecommerce function 1304 allows the system to display products and services, from third party providers, on a monthly or recurring schedule.

Soil and water sampling function 1306 allows a user to request water and soil analysis by delivering samples in a branded box which is then processed and returned to the user.

Heat mapping function 1308 allows the user to see visualizations of data by geography based on plant adoption and health, plant disease, soil and water chemistry and user participation.

Figure 14:
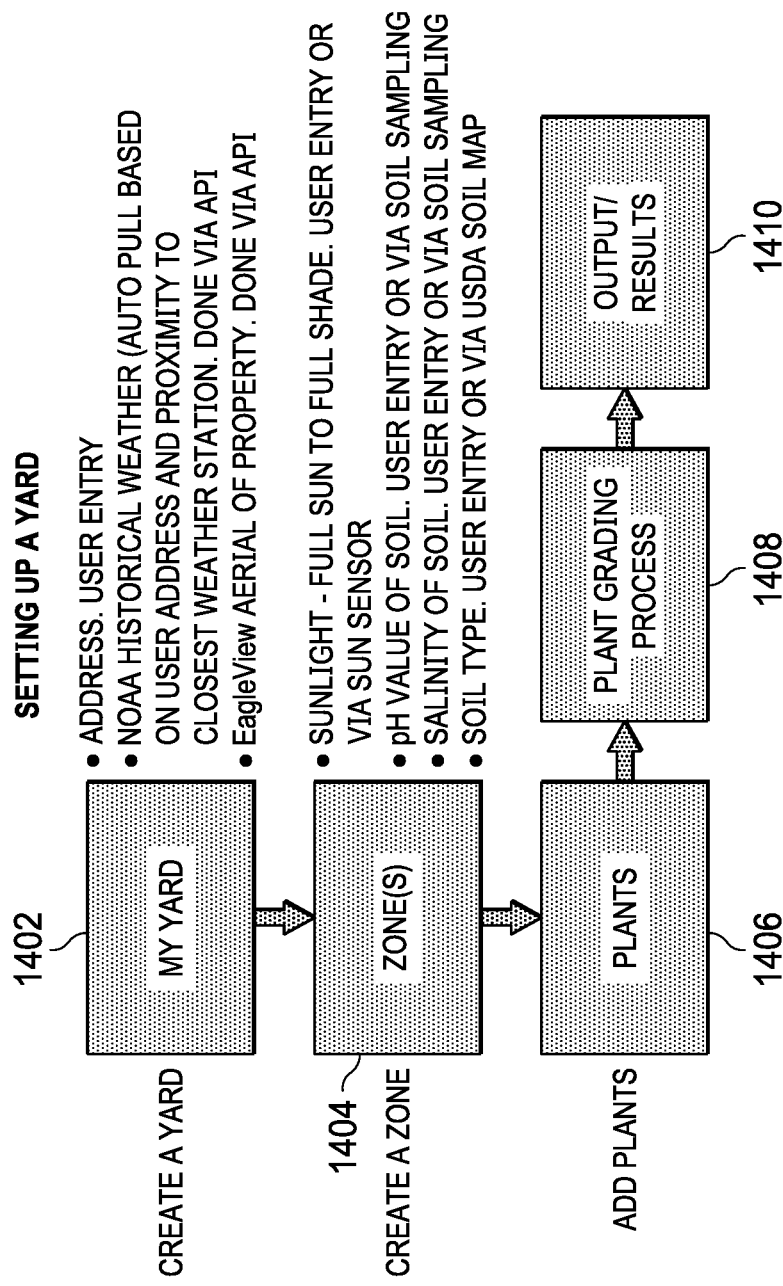
FIG. 14 is method of data input for a yard in a preferred embodiment.

Referring to FIG. 14, user input for setting up a yard will be further described. In step 1402, the user creates a yard record and the user enters an address. The system then pulls NOAA historical weather data based on the proximity of the closest weather station to the address done via API. In step 1404, the user creates a zone in the yard. An aerial view of the property is then downloaded via API. A sunlight full sun to full shade data entry is entered by the user. A pH value of the soil is then entered by the user or by soil sampling. Solidity of the soil is then entered by the user or by soil sampling. Soil type is then entered by the user or by the USDA soil map. In step 1406, the user adds a plant to the zone. A drop-down list is provided that displays all available plant records in the database.

In step 1408, each plant is graded for viability by the system. To assess the probability of success in growing a specific species of plant, input values for a specific location are compared to optimum values defined by a plant species profile, as will be further described.

Inputs for determining a plant grade may include the geolocation of yard based on address, the zone details, such as sunlight, soil type, and pH, the plant water preference, the climate data, the water chemistry, and the optimum values of for the plant species.

Sunlight values may be determined by user input or via a sun sender. Values may include: Full Sun (6+ hours per day); High Sun (4-6 hours per day); Partial Shade (2-4 hours per day); Full Shade (little or no direct sun); and Adaptable.

Soil Type may be determined by user input or via soil sampling or USDA soil mapping. Values may include: Loam; Sandy Loam; Clay; Sandy Clay; Sand; and Adaptable.

The pH values may be determined by user input or via soil sampling. Values may include: Extremely Acidic (3.5-4.4); Very Strongly Acidic (4.5-5.0); Strongly Acidic (5.1-5.5); Moderately Acidic (5.6-6.0); Slightly Acidic (6.1-6.5); Neutral (6.6-7.3); Slightly Alkaline (7.4-7.8); Moderately Alkaline (7.9-8.4); Strongly Alkaline (8.5-9.0); and Adaptable.

Water Preference is determined by plant type preference such as high, medium, or low.

Climate data is based on geo-location of yard. Based on the address of the system user's yard, the system determines the closest NOAA weather station and pulls historical and current data. In a preferred embodiment, the data retrieved from the NOAA includes average monthly temperature, average monthly precipitation, average first freeze date, and average last freeze date. The system may also determine and consider the USDA cold hardiness/growing zone of the user's yard. The system may be configured to consider more or less climatic data.

Water chemistry is determined through sample testing. When a sample is received the system stores the calcium, sodium, and any other minerals & metals. The overall quality of the water is gauged based on the water sampling report.

In step 1410, the plant grade results, or plant viability score, are sent to the user device and displayed.

Figure 15:
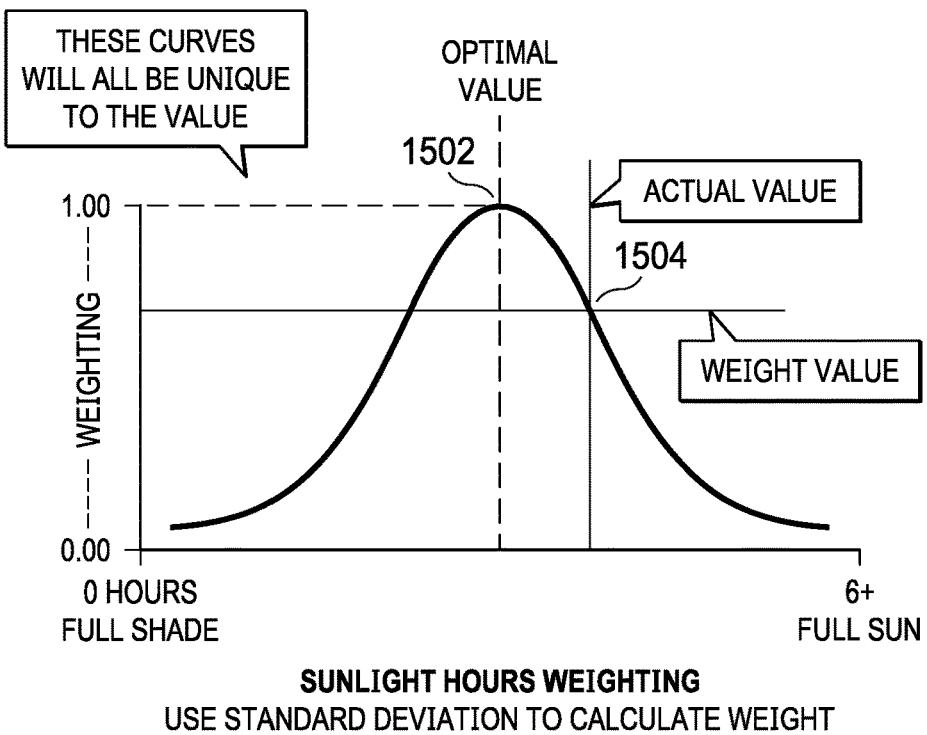
FIGS. 15 through 24 are standard deviation curves for weighing plant factors in a preferred embodiment.

Referring then to FIG. 15, the function of sunlight hours weighting used for plant scoring will be further described. Sunlight hours weighting includes identifying optimal value 1502 for each plant ID type, which is then "normalized" to 1.0. A standard deviation curve with a lower bound, 0 hours of direct sun, and an upper bound, 6+ hours of direct sun, is then used to calculate the weight value for the plant type. The highest point on the standard deviation curve is positioned at the optimal value for the amount of sunlight for the plant ID types. The weight value is determined by determining the actual sunlight received by the actual plant located in the yard, on the x-axis and the locating the intersection on the standard deviation curve. The intersection is then indexed to the weight value between 0 and 1 on the y-axis. The actual sunlight hours value may either be input by a user or retrieved from a sun sender. The actual sunlight hours value is scaled using the standard deviation curve to arrive at weighted value 1504 between 0 and 1.

Figure 16:
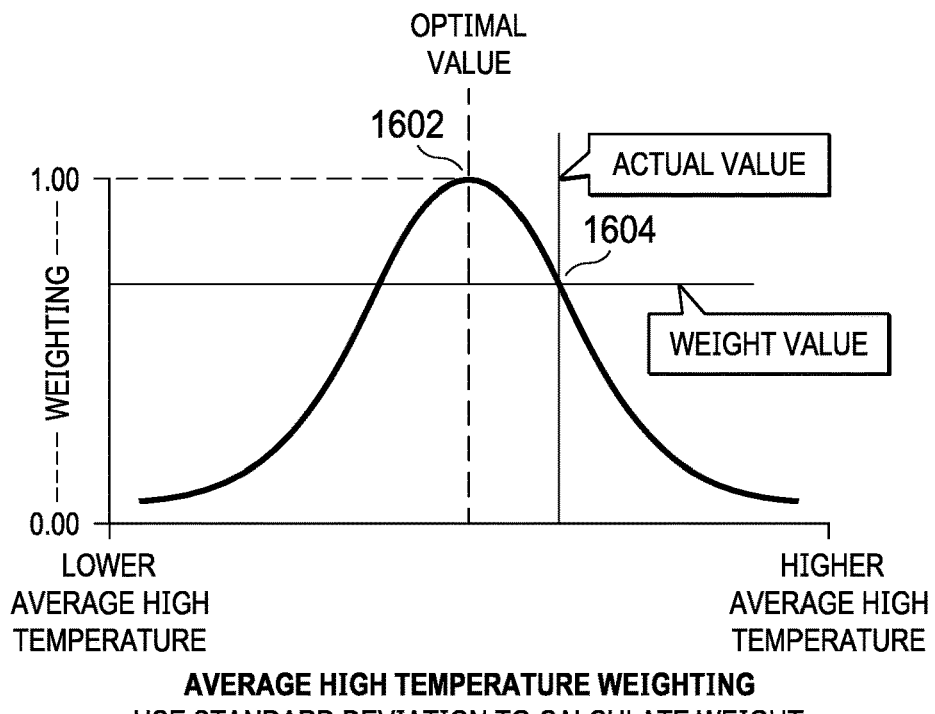

Referring then to FIG. 16, the function of average high temperature used for plant scoring will be further described. The average high temperature includes identifying optimal value 1602 for each plant ID type, which is then normalized to 1.0. The optimal value coordinates with the high temperature tolerance of a plant ID. A standard deviation curve with a lower bound, lower average high temperature, and an upper bound, higher average high temperature, is then used to calculate the weight value for the plant type, as previously described. The system retrieves the average high temperature for the plant location. The actual average high temperature is scaled using the standard deviation curve to arrive at weighted value 1604 between 0 and 1.

Figure 17:
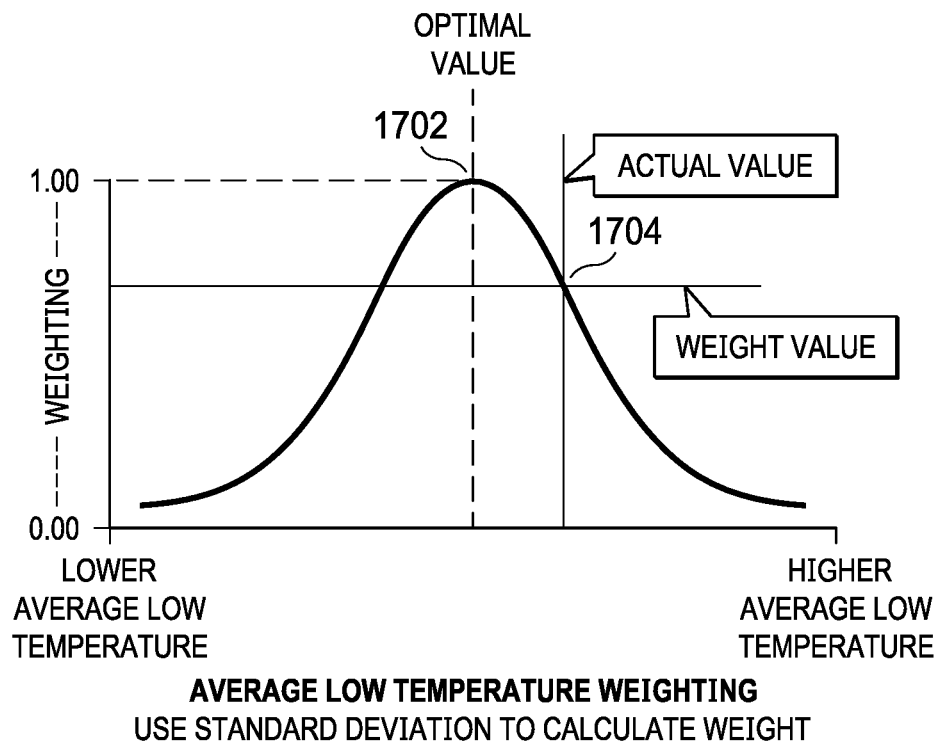

Referring then to FIG. 17, the function of average low temperature used for plant scoring will be further described. The average low temperature includes identifying optimal value 1702 for each plant ID type, which is then normalized to 1.0. The optimal value coordinates with the lowest temperature tolerance of a plant ID. A standard deviation curve with a lower bound, lower average low temperature, and an upper bound, higher average low temperature, is then used to calculate the weight value for the plant type, as previously described. The system retrieves the average low temperature for the plant location. In a preferred embodiment, the system returns any negative number as zero. The actual average low temperature is scaled using the standard deviation curve to arrive at weighted value 1704 between 0 and 1.

Figure 18:
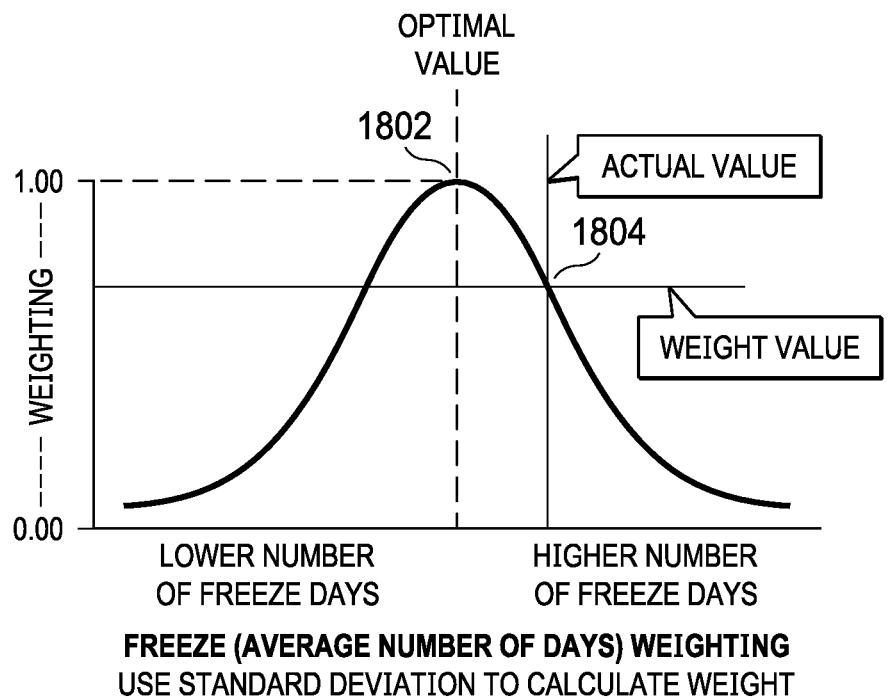

Referring then to FIG. 18, the function of freeze days used for plant scoring will be further described. Freeze days includes identifying optimal value 1802 for each plant ID type, which is then normalized to 1.0. The optimal value coordinates with the number of days with freezing temperatures tolerated by a plant ID. A standard deviation curve with a lower bound, lower number of freeze days, to an upper bound, higher number of freeze days, is then used to calculate the weight value for the plant type, as previously described. The system retrieves the average number of days the temperature is below freezing for the plant location. The actual average number of days the temperature is below freezing is scaled using the standard deviation curve to arrive at weighted value 1804 between 0 and 1.

Figure 19:
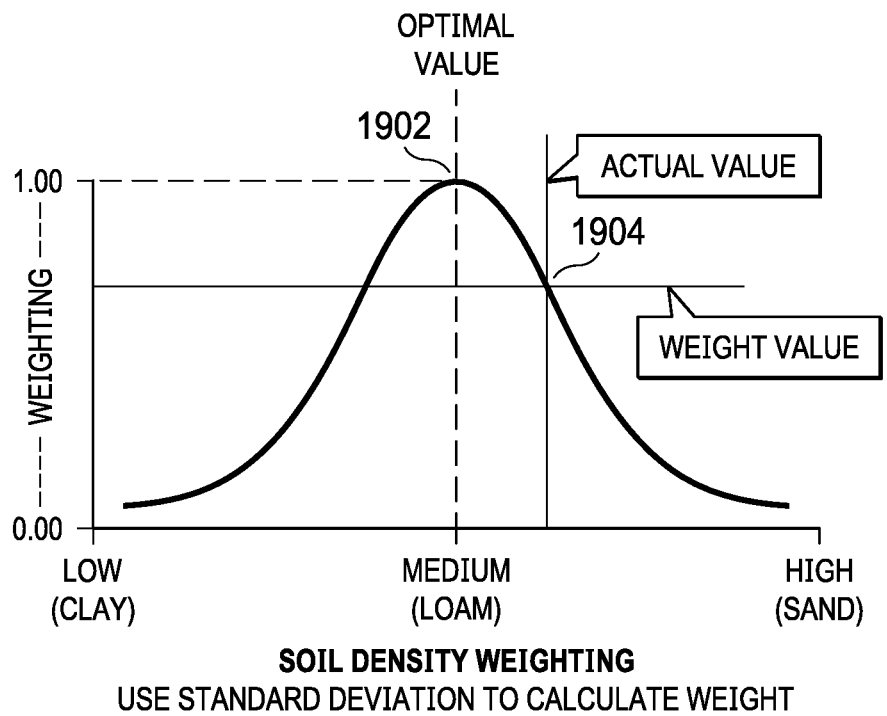

Referring then to FIG. 19, the function of soil density used for plant scoring will be further described. Soil density includes identifying optimal value 1902 for each plant ID, which is then normalized to 1.0. The optimal value of soil density coordinates with the soil type preferred by a plant ID, such as sand, loam, or clay. A standard deviation curve with a lower bound, low density clay, to an upper bound, high density sand, is then used to calculate the weight value for the plant type, as previously described. In a preferred embodiment, the actual soil density is determined through soil analysis of a user submitted sample. In alternate embodiments, the actual soil density may be determined from user input or data from local geological surveys. The actual soil density for the plant location is then scaled using the standard deviation curve to arrive at weighted value 1904 between 0 and 1.

Figure 20:
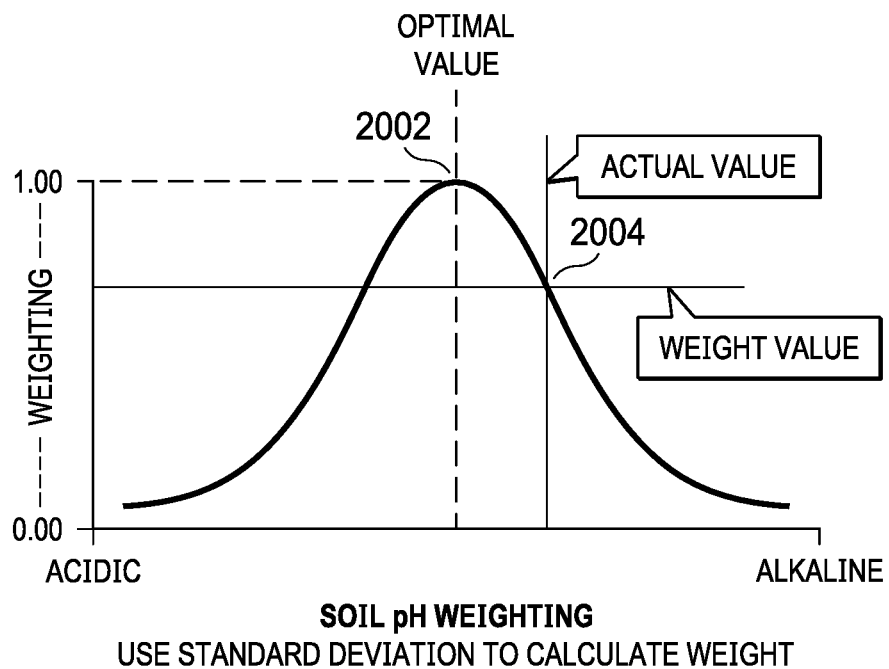

Referring then to FIG. 20, the function of soil pH used for plant scoring will be further described. Soil pH includes identifying optimal value 2002 for each plant ID, which is then normalized to 1.0. The optimal value coordinates with the soil pH preferred by a plant ID. A standard deviation curve with a lower bound, acidic, to an upper bound, alkaline, is then used to calculate the weight value for the plant type, as previously described. The actual soil pH is determined either from user input, or through soil analysis of a user submitted sample. The actual soil pH for the plant location is scaled using the standard deviation curve to arrive at weighted value 2004 between 0 and 1.

Figure 21:
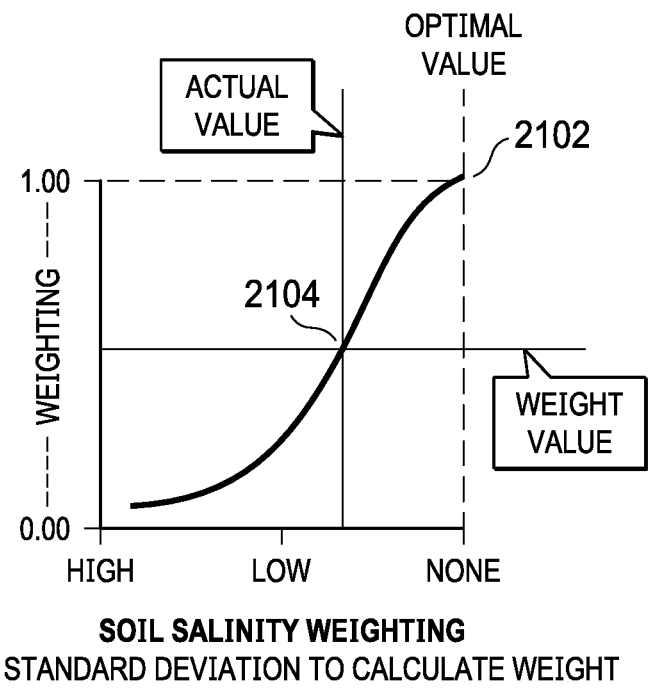

Referring then to FIG. 21, the function of soil salinity used for plant scoring will be further described. Soil salinity includes identifying optimal value 2102 for each plant ID, which is then normalized to 1.0. The optimal value coordinates with the soil salinity preferred by a plant ID, typically zero. A standard deviation curve with a lower bound, high salt content, to an upper bound, zero salt content, is then used to calculate the weight value for the plant type, as previously described. The actual soil salinity is determined either from user input, or through soil analysis of a user submitted sample. The actual soil salinity for the plant location is scaled using the standard deviation curve to arrive at weighted value 2104 between 0 and 1.

Figure 22:
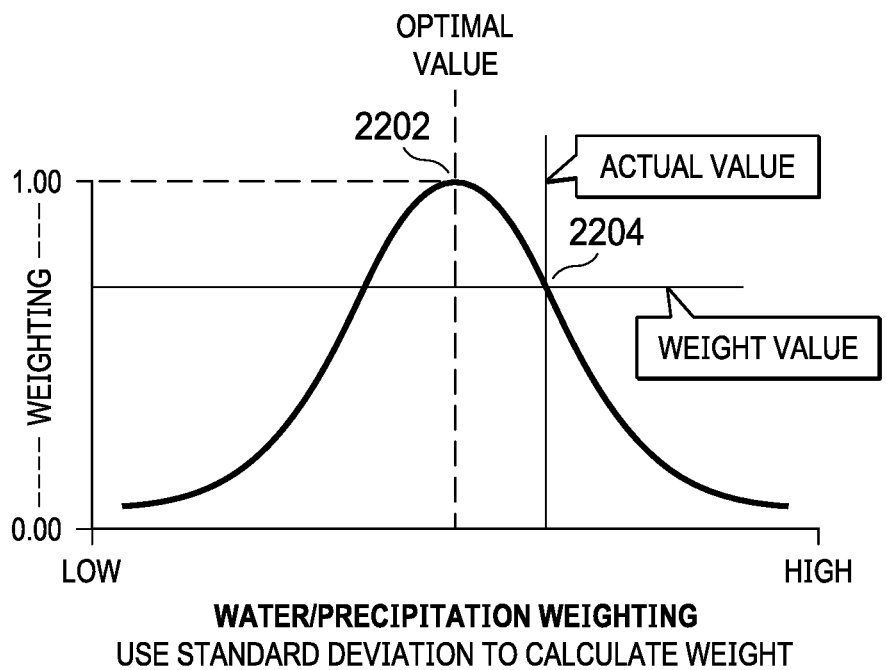

Referring then to FIG. 22, the function of water precipitation used for plant scoring will be further described. Water precipitation includes identifying optimal value 2202 for each plant ID, which is then normalized to 1.0. The optimal value coordinates with the amount of water preferred by a plant ID. A standard deviation curve with a lower bound, low water, to an upper bound, high water, is then used to calculate the weight value for the plant type, as previously described. The actual water precipitation is determined from user input and local weather patterns are retrieved from the meteorological provider. The actual soil salinity for the plant location is scaled using the standard deviation curve to arrive at weighted value 2204 between 0 and 1.

Figure 23:
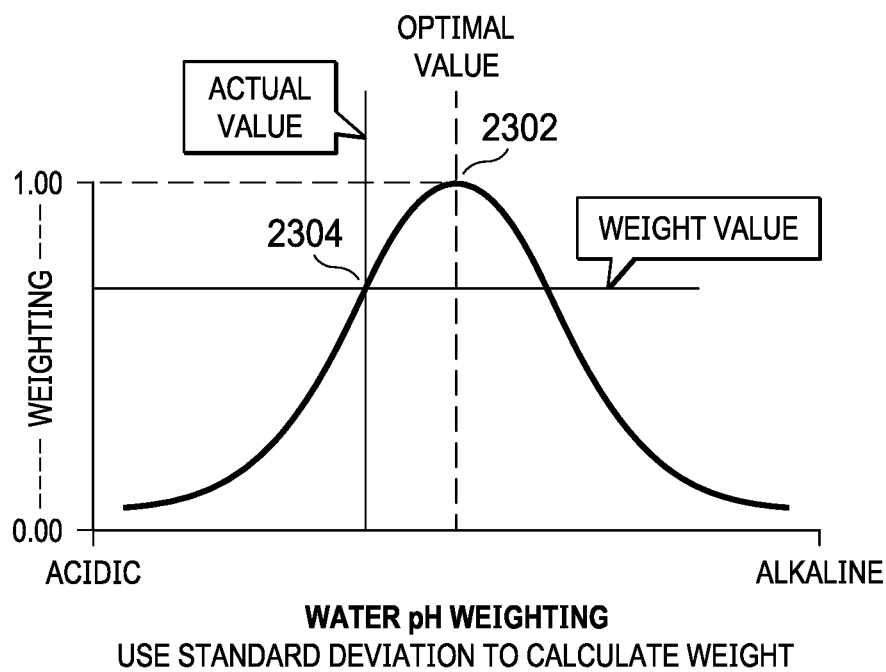

Referring then to FIG. 23, the function of water pH used for plant scoring will be further described. Water pH includes identifying optimal value 2302 for each plant ID, which is then normalized to 1.0. The optimal value coordinates with the water pH preferred by a plant ID. A standard deviation curve with a lower bound, acidic, to an upper bound, alkaline, is then used to calculate the weight value for the plant type, as previously described. The actual water pH is determined either from user input, or through water analysis of a user submitted sample. The actual water pH for the plant location is scaled using the standard deviation curve to arrive at weighted value 2304 between 0 and 1.

Figure 24:
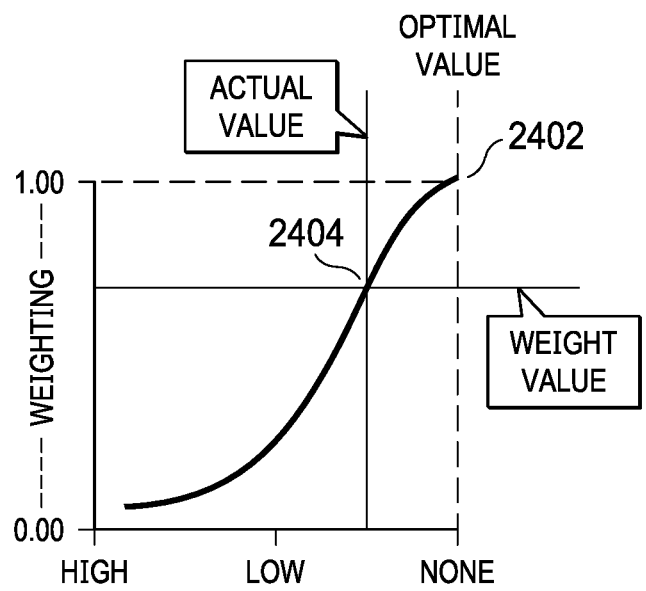

Referring then to FIG. 24, the function of water salinity used for plant scoring will be further described. Water salinity includes identifying optimal value 2402 for each plant ID, which is then normalized to 1.0. The optimal value coordinates with the water salinity preferred by a plant ID, typically zero. A standard deviation curve with a lower bound, high salt content, to an upper bound, zero salt content, is then used to calculate the weight value for the plant type, as previously described. The actual water salinity is determined either from user input, or through water analysis of a user submitted sample. The actual water salinity for the plant location is scaled using the standard deviation curve to arrive at weighted value 2404 between 0 and 1.

Figure 25:
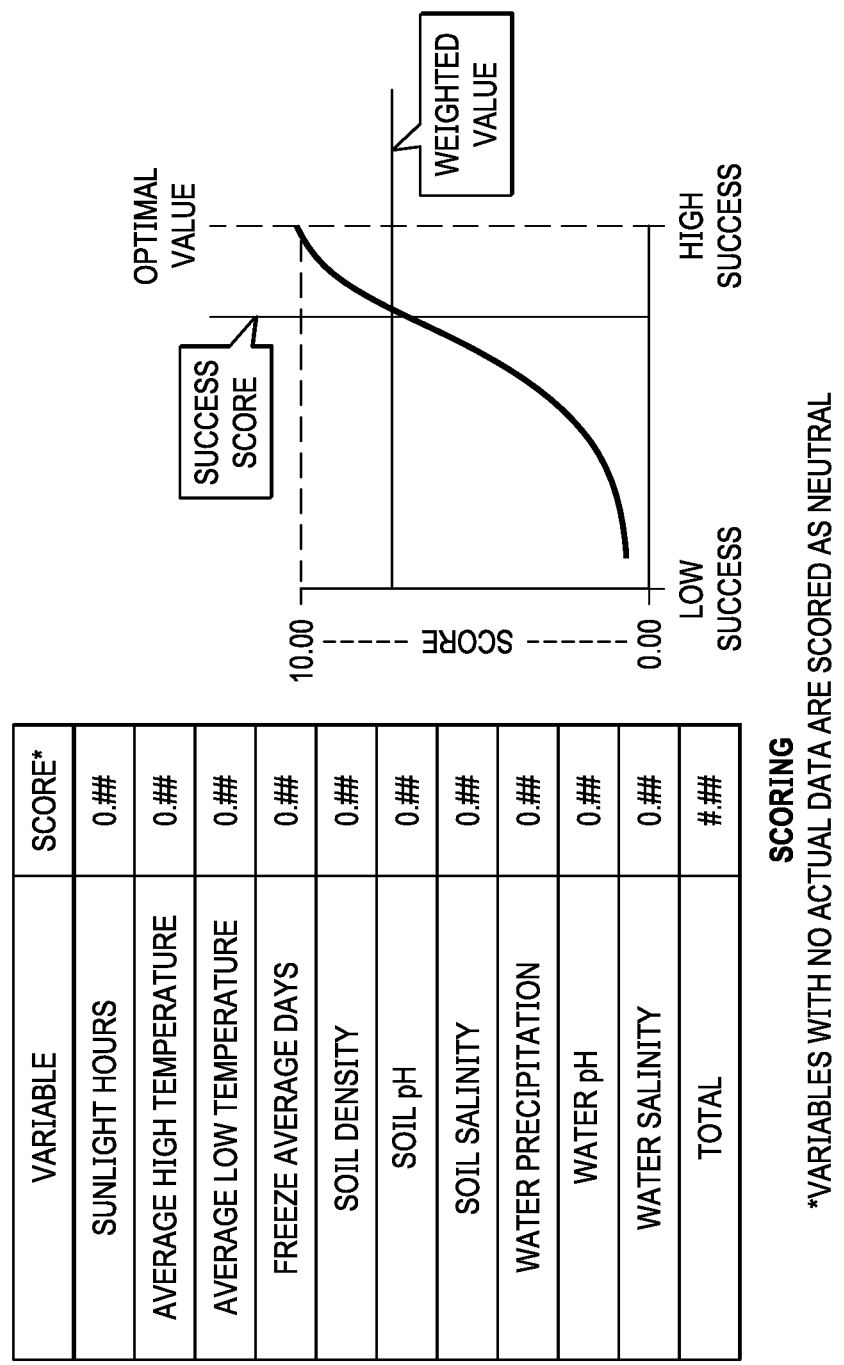
FIG. 25 is a standard deviation curve for determining plant scores in a preferred embodiment.

Referring to FIG. 25, the weighted scores for all of the factors are then added together to arrive at a total score for the plant ID type at the location. In this embodiment, the total score is interpreted as a plant viability indicator or plant viability score.

Figure 26:
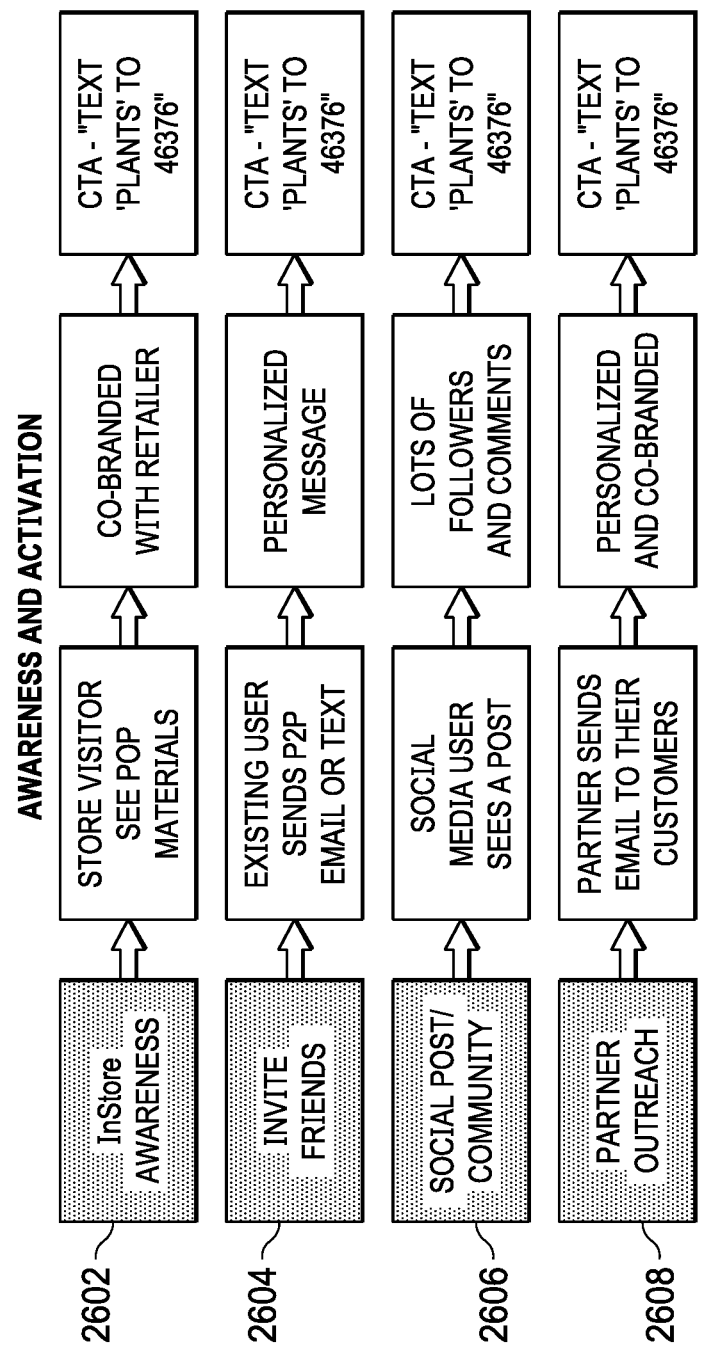
FIG. 26 is a diagram of available functions in the system for a preferred embodiment.

Referring to FIG. 26, a further description of system operation is provided. The system allows commercialization by instore awareness function 2602, invite friends function 2604, social posts/community function 2606, and partner outreach function 2608.

With respect to instore awareness function 2602, a potential customer is presented with point of purchase materials at a brick-and-mortar location retailer. An offer is communicated to the potential customer when the potential customer checks certain words or terms to a predetermined number.

In invite friends function 2604, existing customers forward emails and texts to contacts along with a personal message. In response to the personal message, the potential customer texts a predetermined word to a predetermined number.

In social post/community function 2606, potential customer review posts via social media and then texts a predetermined word to a predetermined number.

With partner outreach function 2608, a partner such as a brick-and-mortar sends an email to existing customers which are personalized and cobranded. The potential customers then respond by texting a predetermined word to a predetermined number.

Figure 27A:
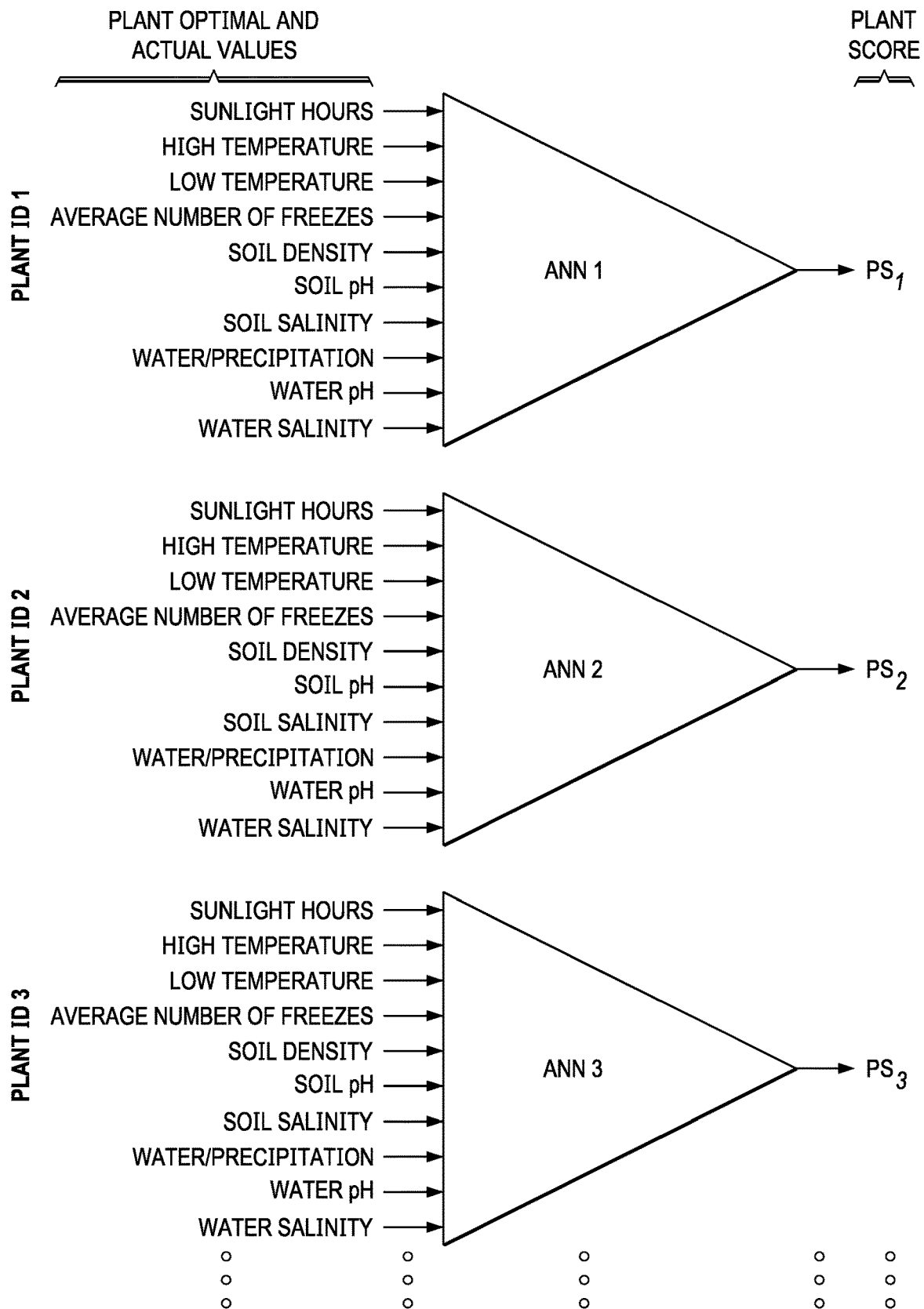
FIG. 27A is a preferred embodiment of an AI processor for plant data.

As shown in FIG. 27A, in a preferred embodiment, the AI processor maintains a separate artificial neural network for each Plant ID. In a preferred embodiment, each of these neural networks is the same type, with the same numbers of nodes and layers, as will be further described. The input for each artificial neural network is one or more data sets attributed to the features considered in plant scoring: the hours of sunlight, the average high temperature, the average low temperature, the average number of days below freezing, the soil density, the soil pH, the soil salinity, the amount of water (precipitation), the water pH, and water salinity for each Plant ID. Each of the values input is normalized to between 0 and 1. Each artificial neural network produces an output which is interpreted as a plant viability score. During training, known values of plant features and plant scores are input to calculate a set of trained synapse weights which are then used in the functioning artificial neural network, as will be further described.

Figure 27B:
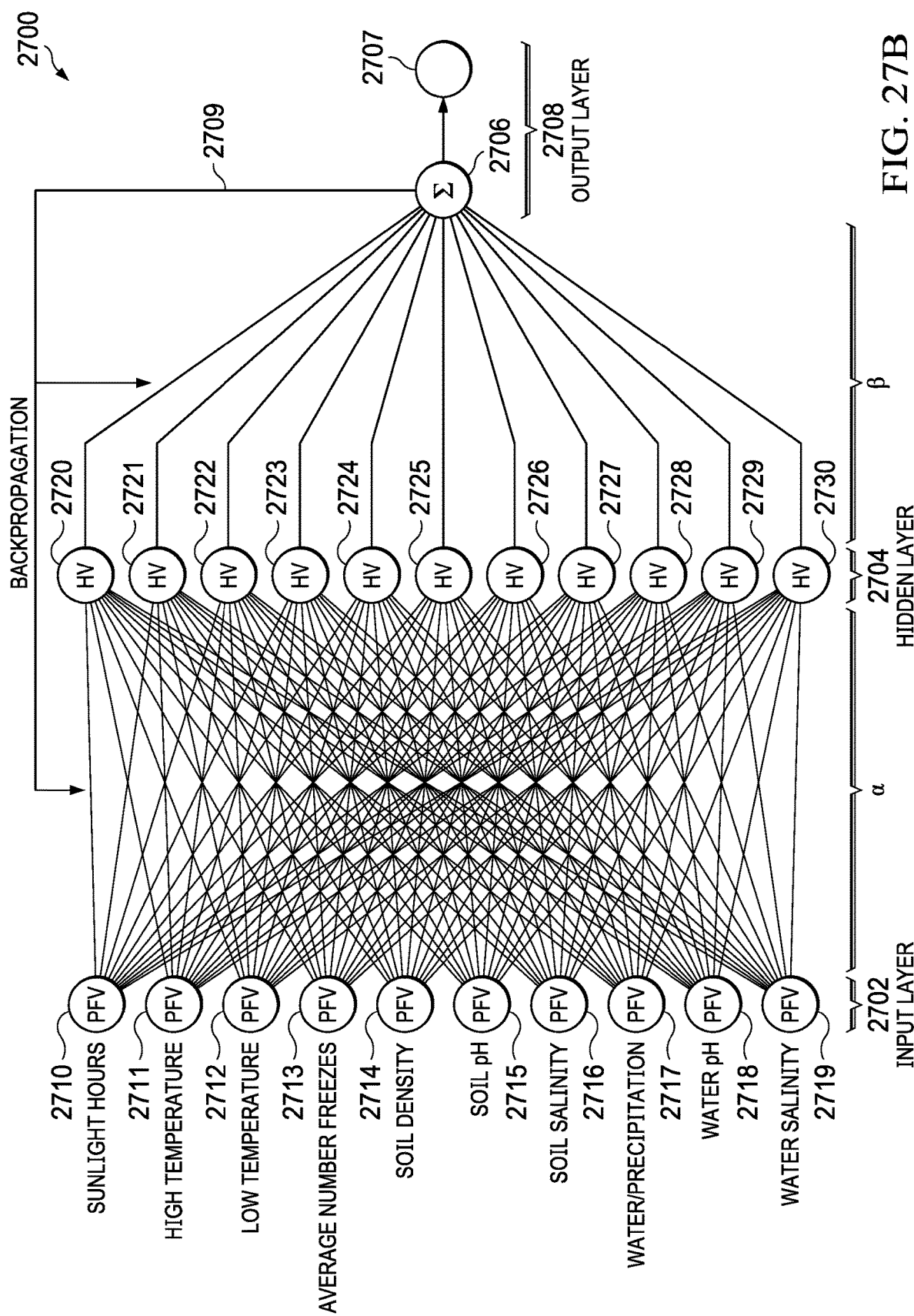
FIG. 27B is a preferred embodiment of an artificial neural network for predicting horticulture viability.

Referring to FIG. 27B, a preferred embodiment of a single artificial neural network for predicting a plant score for one Plant ID will be further described. Neural network 2700 includes input layer 2702, hidden layer 2704, and output layer 2708. Other numbers of nodes and layers may be used.

Input layer 2702 has one node for each feature considered in plant scoring. In a preferred embodiment, input layer 2702 consists of ten (10) input nodes, 2710-2719. Input nodes 2710, 2711, 2712, 2713, 2714, 2715, 2716, 2717, 2718, and 2719 represent input values for the hours of sunlight, the average high temperature, the average low temperature, the average number of days below freezing, the soil density, the soil pH, the soil salinity, the amount of water and precipitation, the water pH, and water salinity for a specific plant ID, respectively. In other embodiments, the input layer may have a greater or lesser number of nodes based on the desired features. In this example, input data is a 10×1 matrix with one field for each data category. Training data further includes an output value for each data set.

Each node of input layer 2702 is connected to each node of hidden layer 2704 via $\alpha$ synapses. Each $\alpha$ synapse is assigned a weight between 0 and 1. The input layer nodes are multiplied by the $\alpha$ synapses, summed, and processed using an activation function to produce the hidden layer nodes, as will be further described.

In a preferred embodiment, hidden layer 2704 is comprised of eleven (11) weighted nodes 2720, 2721, 2722, 2723, 2724, 2725, 2726, 2727, 2728, 2729 and 2730. Hidden layer 2704 preferably includes a bias node. The inclusion of a bias node reduces the variance and increases efficiency. One of skill in the art will recognize that other arrangements, numbers and layers of neurons are possible that may provide the desired predictive features of the invention.

Each node of hidden layer 2704 is connected to output layer 2708 by synapses. Each $\beta$ synapse is assigned a weight between 0 and 1.

Neural network 2700 produces a single value in output layer 2708, which indicates predicted plant score. After training, when queried with a new data set, each neural network produces a plant "score". Output layer 2708 is comprised of summation node 2706 and output node 2707. The nodes of hidden layer 2704 are multiplied by $\beta$ synapses and summed to produce summation node 2706. The value of the summation node is processed using an activation function to produce output node 2707, as will be further described.

During back propagation 2709, the derivative of the loss function is calculated and applied to the $\alpha$ and $\beta$ synapses to train the network, as will be further described. Output node 2707 contains the final output value of the neural network for each input data set.

Figures 28A, 28B:
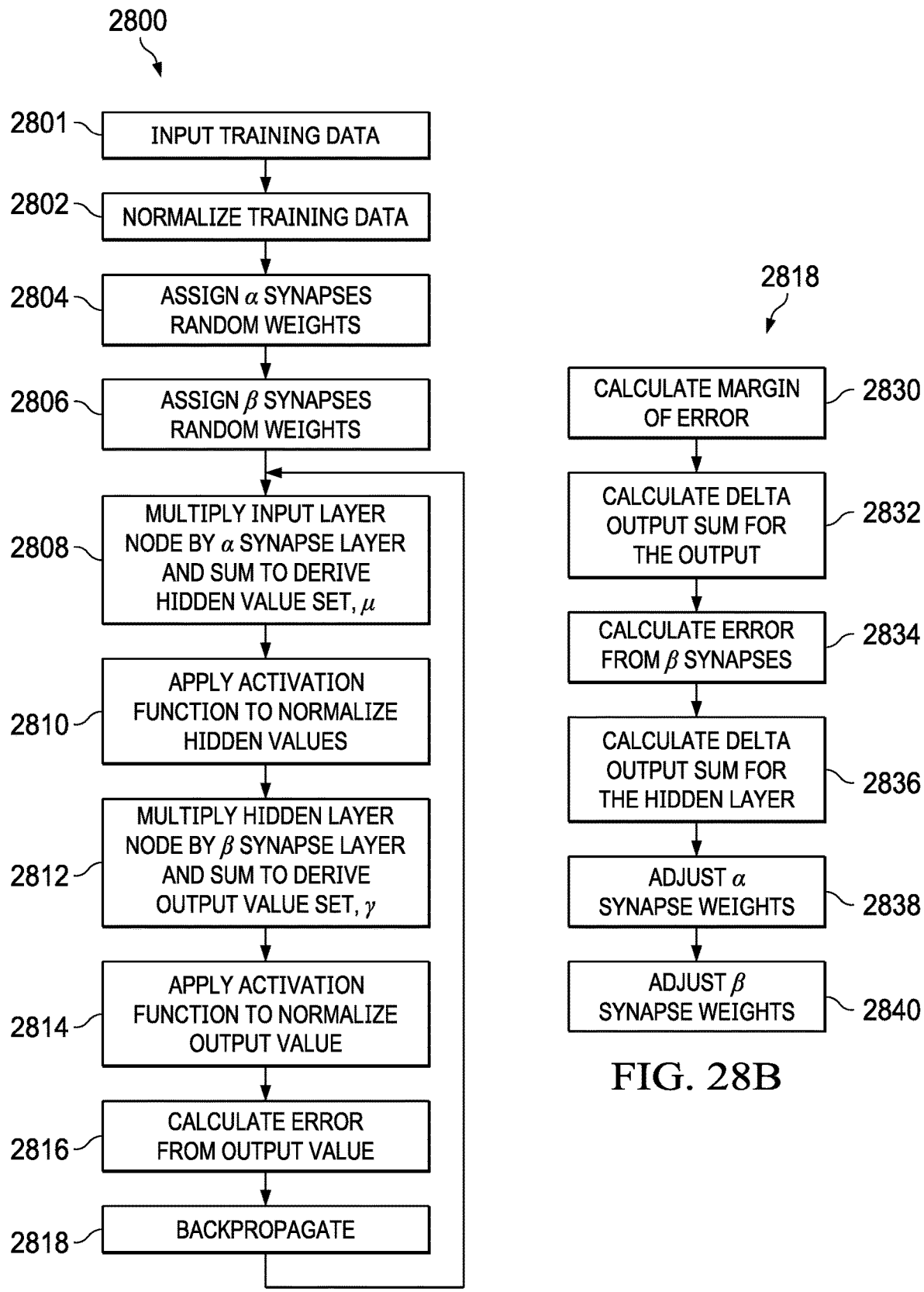
FIGS. 28A and 28B are a flow chart of a method for training and using an artificial neural network in a preferred embodiment.

Referring to FIG. 28A, a flow chart of method 2800 for training each artificial neural network will be described.

At step 2801, training data is input into the neural network. Training data is supplied to the algorithm as sets of 10×1 matrices of plant factor values (PFV) and resulting plant scores y. In a preferred embodiment, 15,000 to 20,000 training data sets are required to approach an optimal set of synapse values.

An example of training data values is shown in Table 1. In this example, a Plant ID 'X' may receive an overall score between 0 and 10, with 10 being associated with the optimal "viability" values for the plant species.

TABLE 1

| Plant X | Plant Factors (x) | Plant Score (y) |
|---|---|---|
| 1 | [2, 95, 28, 14, 3, 4.2, 3, 15, 3.4, 7] | [10] |
| 2 | [1, 85, 8, 23, 4, 3.9, 9, 6, 2.1, 15] | [3] |

TABLE 1-continued

| Plant X | Plant Factors (x) | Plant Score (y) |
|---|---|---|
| 3 | [3, 88, 28, 14, 3, 4.2, 3, 15, 5.9, 2] | [7] |
| ... | ... | ... |
| n | [$x_{1n}, x_{2n}, x_{3n}, x_{4n}, x_{5n}, x_{6n}, x_{7n}, x_{8n}, x_{9n}, x_{10n}$] | [$y_n$] |

At step 2802, in a preferred embodiment, all input values are normalized to a value between 0 and 1 by dividing each variable by the maximum permitted value of the variables.

At step 2804, each of the α synapses are assigned a random weight, $\alpha_n$, between 0 and 1. At step 2806, each of the β synapses are assigned a random weight, $\beta_n$, between 0 and 1.

At step 2808, the input values and the α synapse weights are multiplied in a matrix operation and summed to determine hidden value, $HV_{mn}$, for each node n in hidden layer 2704, according to the following equation:

$$HV_{mn} = \Sigma PFV_n \times \alpha_m \qquad \text{Eq. 3}$$

where:
n=number of PFV nodes; and
m=number of hidden nodes.

At step 2810, the activation function is applied to the set of hidden values, $HV_{mn}$. In a preferred embodiment, the activation function is the Sigmoid function. The Sigmoid function is preferred because its derivative can be efficiently calculated. The activation function is shown below:

$$\Omega_n = S(HV_{mn}) = \frac{1}{1 + e^{-HV_{mn}}} = \frac{e^{HV_{mn}}}{e^{HV_{mn}} + 1} \qquad \text{Eq. 4}$$

where:
$\Omega_n$ is the value of nodes 1-11 of hidden layer 2704; and
$HV_{mn}$ is the hidden value of the hidden layer nodes.

At step 2812, the values $\Omega_n$ and the β synapse weights are multiplied in a matrix operation and summed to determine summation value, γ, for summation node 2706, according to the following equation:

$$\gamma = \Sigma \Omega_n \times \beta_m \qquad \text{Eq. 5}$$

At step 2814, the activation function is applied to the value, γ, calculated in step 2812 to produce an output value for node 2707.

At step 2816, the error is calculated mean sum squared loss function. The mean sum squared loss function is the sum for all data points of the square of the difference between the predicted and actual target values divided by the number of sets of data, according to the following equation:

$$\text{Error} = \sum \frac{(Output_n - y_n)^2}{n} \qquad \text{Eq. 6}$$

where:
$Output_n$ is the predicted plant score; and
$y_n$ is a known output value input in the system in step 2801.

In step 2818, the neural network backpropagates to minimize Loss, as will be further described.

Steps 2808 through 2818 are repeated for a preset number of iterations. In a preferred embodiment, a preset number of iterations is used, anywhere from 20,000 to 200,000. Once the system executes the number of iterations, the neural network is considered "trained" and the ideal values of α and β synapses are stored. In an alternate embodiment, if an ideal error, such as 0.01%, is achieved prior to executing all iterations, the neural network is similarly considered trained. Other iterations counts and ideal errors may be used. A higher iteration count reduces the Error and increases the accuracy of the synapse weights.

Referring then to FIG. 28B, a preferred method for backpropagation in step 2818 is described.

At step 2830, the margin of error of output layer 2708, error margin, is calculated according to the following equation:

$$\text{Error Margin} = y_n - Output_n \qquad \text{Eq. 7}$$

At step 2832, the delta output sum for output layer 2708, $\Delta_1$, is calculated. The delta output sum, $\Delta_1$, is calculated by applying the derivative of the sigmoid activation function to the output error calculated in step 2830. The derivative of the sigmoid activation function for an output of "x" is x(x−1).

At step 2834, determine the error attributable to hidden layer 2704, the hidden error. The hidden error is calculated by calculating the dot product of the delta output sum, $\Delta_1$, and the β synapse weights.

At step 2836, the delta output sum for hidden layer 2704, $\Delta_2$, is calculated by applying the derivative of the sigmoid activation function to the hidden error calculated in step 2834, as previously described.

At step 2838, the α synapses weights are adjusted by calculating the dot product of input layer 2702 nodes and the delta output sum, $\Delta_2$. At step 2840, the β synapses weights are adjusted by calculating the dot product of hidden layer 2704 nodes and the delta output sum, $\Delta_1$. The adjusted weights are returned, and the neural network uses the new weights in the next training iteration. When the network has trained the present number of iterations the weights are fixed at the values with the lowest mean sum squared loss error.

An example of computer code written in Python to perform one example of the method is shown in FIGS. 29A and 29B. Of course, other code may be used to implement this and other embodiments of the artificial neural network described.

Referring then to FIG. 29A, at line 1, the NumPy library is imported to perform advanced mathematical functions, such as matrix multiplication, which is needed for neural networks. Additional or different libraries may be imported and used to achieve similar results, such as Tensorflow and Keras.

At lines 3-7, the training data is input as a matrix. As an example, four (4) sets of plant factors, x, are input and three (3) sets of plant scores, y are included. In practice between 1,000 and 25,000 data sets would be employed to train each neural network. At lines 9-10, the data is scaled by dividing the x array by its maximum value and the maximum x value and they array by 10, or the maximum plant score, as previously described. At lines 13-15, the data is split into training and testing data. In this example, the first three sets of xy data are used to train the neural network. Once training is complete, the neural network is tested by predicting a plant score for the fourth set of plant factors.

At lines 17-23, the neural network is created. The network has one input layer with ten (10) nodes, one output layer with one (1) node, and one hidden layer with eleven (11) nodes, as previously described.

At lines 25-27, the α synapse and β synapse weights are defined as 11×10 and 11×1 arrays, respectively, and assigned random values.

At lines 29-35, a forward propagation function is defined. When called, the forward propagation function executes steps 2808 through 2814, as previously described. At lines 36-38, the sigmoid activation function is defined. At lines 40-42, the derivative of the sigmoid activation function is defined.

Referring then to FIG. 29B, at lines 44-53, the back propagation function is defined. When called, the back propagation function executes steps 2830 through 2840, as previously described.

At lines 55-58, the system is set to train by using forward propagation to produce an output. At lines 60-63, the system is set to save the synapse weights. At lines 65-69, the system is set to print the plant factors input and the resulting predicted plant score after the neural network is trained.

At lines 71-84, the system runs the neural network until it is trained. In this example the system will run 150,000 iterations of training unless an Ideal loss of 0.001% is achieved. In this example, during training, the neural network is set to print the scaled input, actual output, predicted output, and mean sum squared loss for each iteration run. Once the network is trained, at line 86, the system saves the ideal synapse weights. At line 87, the system predicts a plant score for the fourth set of input data. In a preferred embodiment, the training data would be updated upon entry of every data set from a user, as previously described.

Figure 30:
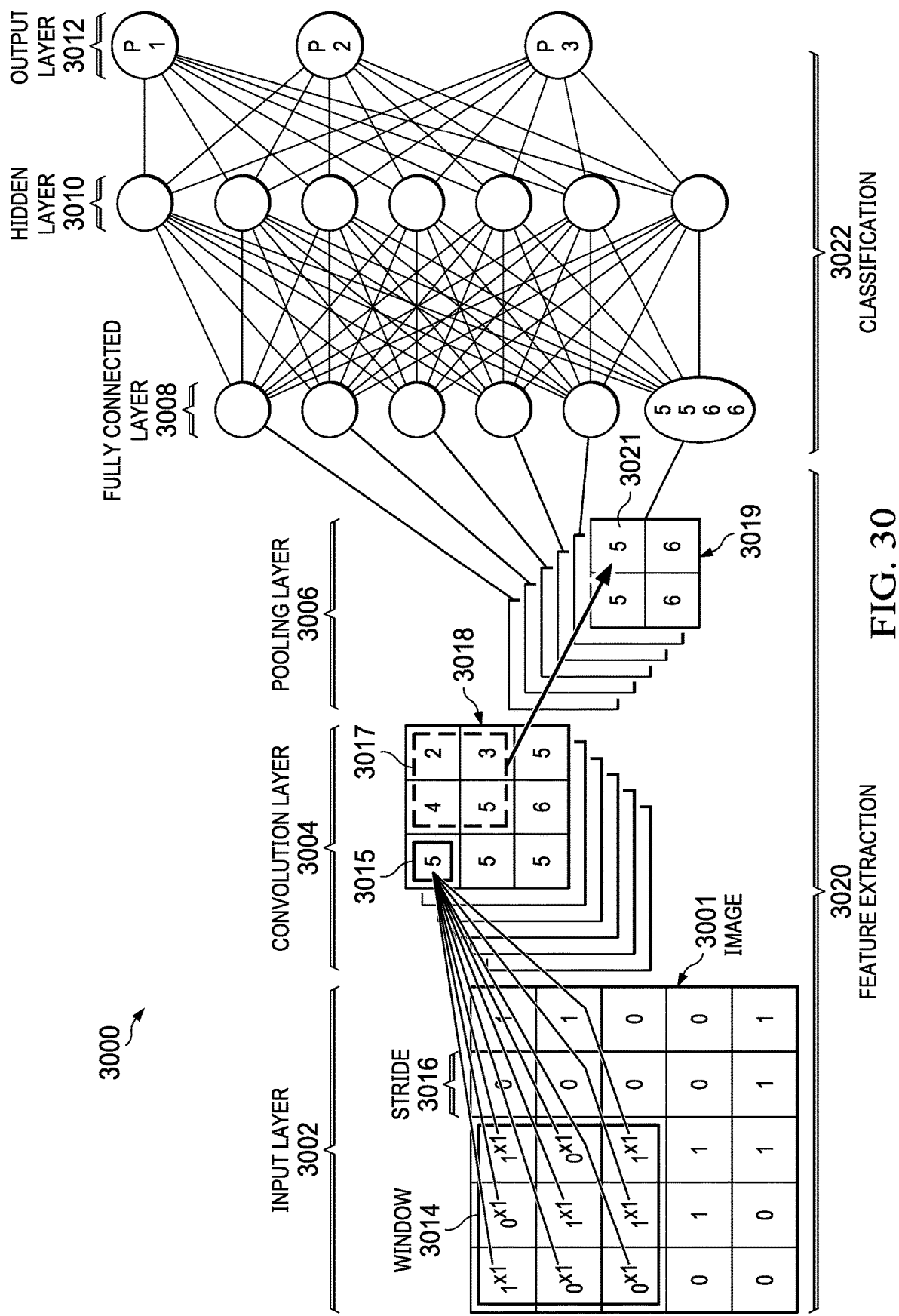
FIG. 30 is a preferred embodiment of a convolutional neural network for identifying a plant ID using image recognition.

Referring then to FIG. 30, a preferred embodiment of convolutional neural network 3000 for image recognition for plant identification will be further described.

Neural network 3000 includes feature extraction layers 3020 and classification layers 3022. The feature extraction layers extract information from an image and formats the data for the classification layer. The classification layer predicts the likelihood that an image is of a specific plant ID, or predicts what the plant in the image is.

Feature extraction layers 3020 includes input layer 3002, convolution layer 3004, and pooling layer 3006. Input layer 3002 is comprised of a large data set of images of plants labeled with a plant ID. In a preferred embodiment all the images are the same size and format. In this example, input image 3001 is a 5×5 pixel image.

Network 3000 examines each image for one or more features through convolution layers 3004. Each convolution layer scans for a different feature, such as edges, patterns, gradients, red, green, and blue, to produce a feature map, such as feature map 3018.

Feature map 3018 is a 3×3 pixel matrix created by scanning regions of image 3001 using window 3014, as will be further described. A window is defined as a set number of pixels per region to examine in an image. In this example, window 3014 is 3×3 pixels and is configured to determine if the image has a single value, such as the color red, as follows:

| | | |
|---|---|---|
| 1 | 1 | 1 |
| 1 | 1 | 1 |
| 1 | 1 | 1 |

Window 3014 moves across image 3001 by defined stride 3016, which is one pixel. The stride is the unit length the window is moved for each region. The convolution layer scans the entire image by region, moving window 3014 by stride 3016. As the window moves across the image, a matrix multiplication of the window and the image is computed and stored in the appropriate region position of the feature map. For example, when window 3014 examines image 3001 for the color red, red is represented by 1 and non-red is 0. As a result, region 3015 is calculated as follows:

$$(1\times1)+(0\times1)+(1\times1)+(0\times1)+(1\times1)+(0\times1)+(0\times1)+(1\times1)+(1\times1)=5$$

Pooling layer 3006 is used to compress the spatial information for each feature map and can reduce overfitting the network. Pooling layer 3006 scans feature map 3018 using window 3017 to produce pooled feature map 3019. In this example, window 3017 is a 2×2 matrix window. The window moves across feature map 3019 by a stride of one. In this example, a "stride" includes a single column width. In this example, window 3017 is configured to compress the values of the feature map into four regions using max pooling. In "max pooling" the maximum value in the window is located and transferred to the corresponding region of the pooled feature map. As a result, region 3021 resulting from window 3017, is "5". In an alternate embodiment, average pooling may be used, which takes the average value in a region.

In yet another embodiment, global feature mapping is utilized to produce uniform compressed feature maps in pooling layer 3006. By using global feature mapping, neural network 3000 is able to accept images of different sizes, however global feature mapping is more computationally expensive. Thus, in a preferred embodiment, images are reduced to a standard size before being input into the neural network to increase efficiency.

It will be appreciated by those skilled in the art that any configuration of window size, stride size, number of feature maps, and pooling layers may be used.

The output of feature extraction layers 3020 are flattened and used for classification layers 3022. Classification layers 3022 includes fully connected layer 3008, hidden layer 3010, and output layer 3012. Classification layers 3022 form the traditional input, hidden, and output layers of a feed forward artificial neural network, such as neural network 2700, as previously described.

Fully connected layer 3008 is a stack of single value representations of all the features present in the image, and acts as the input layer for the feed forward network. For example, the values from pooled feature map 3019 are flattened into a 4×1 matrix and values from six (6) maps in pooling layer 3006 would be flattened into a 24×1 matrix. As a result, fully connected layer 3008 contains 24 nodes. The values are weighed and normalized using an activation function, such as the Sigmoid activation function to produce values for hidden layer 3010, as previously described.

In a preferred embodiment, the hidden layer has one more node than the fully connected layer, in this example 25. The hidden layer is similarly weighted and normalized using an activation function to produce a value for output layer 3012. In this example, output layer 3012 is comprised of three (3) nodes representing three different possible plant IDs present in the image. In a preferred embodiment, the output is comprised of the likelihood that the plant in the image is each of the plants trained in the system. For instance, the value for each of P1, P2, and P3 would range from 0 to 1 with a value of 1 being 100% identification of the plant in the image.

In a preferred embodiment, the system uses transfer learning to accelerate training the neural network. Transfer learning utilizes a pretrained convolutional neural network, such as MobileNet V2 trained on Imagenet, for feature extraction layers 3020. The benefit of transfer learning is that a model trained on a large dataset can skip learning standard features needed for image recognition, such as color, edges, patterns, and gradients, and additional features specific to the purpose are integrated and trained, such as bud and leaf shapes. The network can then be trained on a large dataset of plant images linked with specific plant IDs.

It should be appreciated that different configurations of the number of convolution and pooling layers may be used. Similarly, any configuration of hyperparameters such as the number of hidden layers, the number of neurons per hidden layer, and type of activation function may be used.

Figure 31:
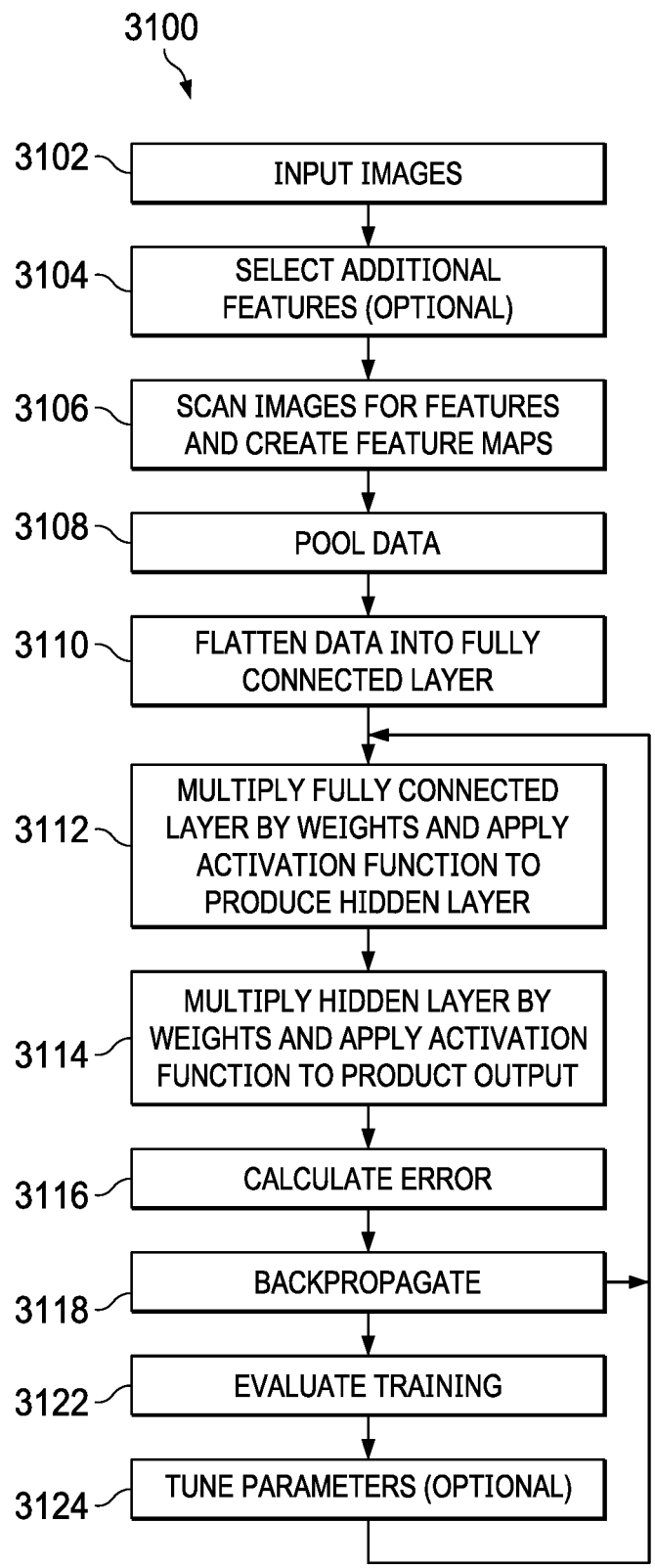
FIG. 31 is a flow chart of a preferred method for training and using a convolutional neural network.

Referring then to FIG. 31 a flow chart of method 3100 for training and a convolutional neural network will be described.

At step 3102, a training session is initiated when a preset number of new images are loaded into the system database. When a new image is uploaded into the database it is set as "add" and converted to the correct size, resolution and format to be evaluated by the neural network. Images are stored in the database according to plant ID. When the set number n of "add" images are loaded into the database, the convolutional neural network automatically retrieves the images and runs a training event. After a training event is complete, the image tags are updated to "remove" and the images are no longer utilized for training the neural network. The image counter resets to zero and another training event will not be initiated unless the preset number of "add" images are loaded or the system receives another triggering event, such as a scheduled training session or notification of an incorrect prediction.

At step 3104, optionally additional features are input into the convolutional neural network model selected as a basis for network 3000. The features are additional convolution layers used to train the network to determine specific plant characteristics such as leaf shape. As additional plant IDs are added to the system additional features may be added.

At step 3106, convolutional layers scan the image for specific features and perform a dot matrix multiplication to create feature maps, as previously described. The feature maps are created in the order the convolutional layers are set to run. At step 3108, the data in the feature maps is compressed using either max or average pooling, as previously described. The feature maps are compressed in the same order they are created. At step 3110, in this example, the pooled data is flattened from 4×4 matrices into a fully connected layer of nodes in a 24×1 matrix. Pooled feature maps are flattened in the same order as their corresponding feature maps are created. Each pooled feature map is parsed out according to a set directionality, generally left to right top to bottom.

At step 3112, a matrix multiplication of the fully connected layer values and a first set of weights is performed to determine a first value of the hidden layer, as previously described. In a preferred embodiment, the weights are initially assigned a training value based on the model selected and are adjusted during training. The first value of the hidden layer is then normalized using an activation function, such as the Sigmoid function, as previously described.

At step 3114, a matrix multiplication of the hidden layer values and a second set of weights is performed and normalized using an activation function to determine output values, as previously described.

At step 3116, the error is calculated using the mean sum squared loss function, as previously described.

In step 3118, the neural network backpropagates to minimize the loss and returns adjusted weight values, as previously described. Step 3112 through 3118 are repeated for a preset number of iterations or until an ideal loss is achieved. In a preferred embodiment, the system is trained at least two epochs.

At step 3122, an automatic evaluation of the trained model is performed and plotted to determine the overall performance of the trained model. At step 3124, optionally parameters may be manually tuned to increase performance. The amount of data used for training, number of hidden layers, number of neurons, number and type of convolutional layers, and type of activation function are some of the parameters that may be manually tuned to increase functionality. If any parameters are adjusted, the system repeats steps 3112 through 3124 as needed.

After training, ideal values of the first and second weights are stored and the convolutional neural network is considered "trained". Additional training sessions may be initiated when a preset number of images are uploaded as "add" to the database or a user submits a plant ID correction, as previously described. A user may then upload images to the system to be identified. The system will return a plant ID based on a confidence score returned in the output layer. The plant ID returned may then be used in calculating a plant viability score, as previously described.

It will be appreciated by those skilled in the art that the described embodiments disclose significantly more than an abstract idea including technical advancements in the field of data processing and a transformation of data which is directly related to real-world objects and situations in that the disclosed embodiments enable a computer to operate more efficiently. For example, the disclosed embodiments transform positions, orientations, and movements of an AR projection based on physical transformation of the position, orientation, and movements of a user device.

It will be appreciated by those skilled in the art that modifications can be made to the embodiments disclosed and remain within the inventive concept, such as by omitting various described features, rearranging features, and using features from one embodiment in another embodiment. Therefore, this invention is not limited to the specific embodiments disclosed, but is intended to cover changes within the scope and spirit of the claims.

The invention claimed is:

1. A system for plant maintenance comprising:
   a system server, connected to a network;
   an administrator device, connected to the system server through the network;
   a client device, connected to the system server through the network;
   a set of processors in the system server, the administrator device, and the client device;
   a set of memories, each memory of the set of memories operably connected to at least one processor in the set of processors;
   the set of memories, including a set of instructions that, when executed causes the system to perform the steps of:
   receiving, at the system server, a first set of plant data from the client device;
   receiving, at the system server, a second set of plant data from a third-party server;
   generating a plant viability score related to the first set of plant data and the second set of plant data;
   receiving, at the client device, a plant image;
   detecting a plant type in the plant image;
   generating augmented reality content based on the plant type; and, receiving at the client device, the plant viability score, the plant type, and the augmented reality content.

2. The system of claim 1 wherein the first set of plant data and the second set of plant data are each comprised of at least one of the group of a location, a plant ID, and a set of plant factors; and,
wherein the set of plant factors are comprised of at least one of the group of a set of climactic data, a set of meteorological data, a set of telemetry data, a set of soil data, a set of water data, and a set of sunlight readings.

3. The system of claim 2 wherein the step of generating a plant viability score further comprises the steps of:
receiving, at the system server, a request for the plant viability score;
determining a set of optimal values for the set of plant factors based on the plant ID;
normalizing the set of optimal values to a first range;
determining a set of weighted factors for the set of plant factors within the first range;
summing the set of weighted factors to produce a first viability score; and,
receiving the first viability score at the client device.

4. The system of claim 1 wherein the step of generating augmented reality content further comprises the steps of:
generating, at the client device, a request for the augmented reality content, the request for the augmented reality content further comprising at least one of the group of a first set of GPS coordinates, a plant type, a plant age, and a plant zone;
transmitting the request, by the client device, to the system server;
generating, at the system server, an augmented reality image based on the request;
transmitting, by the system server, the augmented reality image to the client device;
retrieving, by the client device, a first azimuth reading, a first roll reading, a first pitch reading, and a first magnetic field reading;
displaying, by the client device, the augmented reality image based on the first set of GPS coordinates, the first azimuth reading, the first roll reading, the first pitch reading, and the first magnetic field reading;
retrieving, by the client device, a second set of GPS coordinates, a second azimuth reading, a second roll reading, a second pitch reading, and a second magnetic field reading; and,
translating, by the client device, the augmented reality image based on a comparison between the first set of GPS coordinates, the first azimuth reading, the first roll reading, the first pitch reading, and the first magnetic field reading, and the second set of GPS coordinates, the second azimuth reading, the second roll reading, the second pitch reading, and the second magnetic field reading.

5. The system of claim 1 further comprising:
an artificial neural network, resident on the administrator device, comprised of:
a input layer having a first set of nodes corresponding to a set of plant factors;
a hidden layer, connected to the input layer by a first set of synapses, having a second set of nodes; and,
an output layer, connected to the hidden layer by a second set of synapses, corresponding to the plant viability score.

6. The system of claim 5 wherein the step of generating the plant viability score further comprises the step of training the artificial neural network by:

receiving at least one of a set of training plant factors;
receiving a known viability score for the set of training plant factors;
setting a first set of random values for a first set of synapse weights, corresponding to the first set of synapses;
setting a second set of random values for a second set of synapse weights, corresponding to the second set of synapses;
calculating a first set of hidden values for the hidden layer by multiplying the set of training plant factors by the first set of synapse weights and normalizing;
calculating a first predicted plant viability score by multiplying the first set of hidden values with the second set of synapse weights and summing a first set of normalized node values;
comparing the first predicted plant viability score to the known viability score;
calculating an error in the first predicted plant viability score due to the first set of synapse weights and the second set of synapse weights; and,
adjusting the first set of synapse weights and the second set of synapse weights to create a third set of synapse weights and a fourth set of synapse weights to produce a trained artificial neural network.

7. The system of claim 6 wherein the step of generating the plant viability score further comprises:
receiving, at the system server, a request for the plant viability score, the request including the set of plant factors;
calculating, using the trained artificial neural network, a second set of hidden values by multiplying the set of plant factors with the third set of synapse weights and normalizing; and,
calculating the plant viability score by multiplying the second set of hidden values with the fourth set of synapse weights and summing a second set of normalized node values.

8. The system of claim 1 further comprising:
an artificial neural network, resident on the administrator device, comprised of:
an input layer, having a first set of nodes, corresponding to a set of images;
a convolutional layer, having a set of extracted feature maps, connected to the input layer;
a pooling layer, having a set of compressed feature maps corresponding to the set of extracted feature maps, connected to the convolutional layer;
a fully connected layer, having a second set of nodes, corresponding to a number of values in the set of compressed feature maps, connected to the pooling layer;
a hidden layer, having a third set of nodes, connected to the fully connected layer; and,
an output layer, having a fourth set of nodes, corresponding to a set of probability values related to a plant ID type, connected to the hidden layer.

9. The system of claim 8 wherein the set of instructions further comprise instructions that, when executed cause the system to perform the steps of training the artificial neural network by:
receiving a training image having a plurality of training image pixels;
receiving a known plant ID associated with the training image;
setting a first set of random values for a first set of synapse weights;

setting a second set of random values for a second set of synapse weights;
moving a first local window across a first plurality of sub-regions of the training image to obtain a first plurality of sub-region pixel sets associated with each extracted feature map of the set of extracted feature maps;
moving a second local window across a second plurality of sub-regions of the set of extracted feature maps to obtain a second plurality of sub-region pixel sets associated with each compressed feature map of the set of compressed feature maps;
translating the set of compressed feature maps into a first column matrix for the fully connected layer;
calculating a first set of hidden values for the hidden layer by multiplying the first column matrix by the first set of synapse weights and normalizing;
calculating a set of training plant ID probability values by multiplying the first set of hidden values with the second set of synapse weights and summing a first set of normalized node values;
generating a first predicted plant ID by determining a greatest value of the set of training plant ID probability values;
comparing the first predicted plant ID to the known plant ID;
calculating an error in the first predicted plant ID due to the first set of synapse weights and the second set of synapse weights; and,
adjusting the first set of synapse weights and the second set of synapse weights to create a third set of synapse weights and a fourth set of synapse weights to produce a trained artificial neural network.

10. The system of claim 9 wherein the step of detecting the plant type in the plant image further comprises:
receiving, at the system server, a request for the plant type, the request including the plant image;
moving a third local window across a third plurality of sub-regions of the plant image to obtain a third plurality of sub-region pixel sets associated with each extracted feature map of the set of extracted feature maps;
moving a fourth local window across a fourth plurality of sub-regions of the set of extracted feature maps to obtain a fourth plurality of sub-region pixel sets associated with each compressed feature map of the set of compressed feature maps;
translating the set of compressed feature maps into a second column matrix for the fully connected layer;
calculating a second set of hidden values for the hidden layer by multiplying the second column matrix by the third set of synapse weights and normalizing;
calculating a set of plant ID probability values by multiplying the second set of hidden values with the fourth set of synapse weights and summing a second set of normalized node values; and,
generating the plant type by determining a greatest plant ID probability value of the set of plant ID probability values.

11. A method for plant maintenance comprising:
providing a system server, connected to a network;
providing an administrator device, connected to the system server through the network;
providing a client device, connected to the system server through the network;
providing a set of processors in the system server, the administrator device, and the client device;
providing a set of memories, each memory of the set of memories operably connected to at least one processor in the set of processors;
the set of memories, including a set of instructions that, when executed causes the system to perform the steps of:
receiving, at the system server, a first set of plant data from the client device;
receiving, at the system server, a second set of plant data from a third-party server;
generating a plant viability score related to the first set of plant data and the second set of plant data;
receiving, at the client device, a plant image;
detecting a plant type in the plant image;
generating augmented reality content based on the plant type; and,
receiving at the client device, the plant viability score, the plant type, and the augmented reality content.

12. The method of claim 11 wherein the first set of plant data and the second set of plant data are each comprised of at least one of the group of a location, a plant ID, and a set of plant factors; and,
wherein the set of plant factors are comprised of at least one of the group of a set of climactic data, a set of meteorological data, a set of telemetry data, a set of soil data, a set of water data, and a set of sunlight readings.

13. The method of claim 12 wherein the step of generating a plant viability score further comprises the steps of:
receiving, at the system server, a request for the plant viability score;
determining a set of optimal values for the set of plant factors based on the plant ID;
normalizing the set of optimal values to a first range;
determining a set of weighted factors for the set of plant factors within the first range;
summing the set of weighted factors to produce a first viability score; and,
receiving the first viability score at the client device.

14. The method of claim 11 wherein the step of generating augmented reality content further comprises the steps of:
generating, at the client device, a request for the augmented reality content, the request for the augmented reality content further comprising including at least one of the group of a first set of GPS coordinates, a plant type, a plant age, and a plant zone;
transmitting the request, by the client device, to the system server;
generating, at the system server, an augmented reality image based on the request;
transmitting, by the system server, the augmented reality image to the client device;
retrieving, by the client device, a first azimuth reading, a first roll reading, a first pitch reading, and a first magnetic field reading;
displaying, by the client device, the augmented reality image based on the first set of GPS coordinates, the first azimuth reading, the first roll reading, the first pitch reading, and the first magnetic field reading;
retrieving, by the client device, a second set of GPS coordinates, a second azimuth reading, a second roll reading, a second pitch reading, and a second magnetic field reading; and,
translating, by the client device, the augmented reality image based on a comparison between the first set of GPS coordinates, the first azimuth reading, the first roll reading, the first pitch reading, and the first magnetic field reading, and the second set of GPS coordinates, the second azimuth reading, the second roll reading, the second pitch reading, and the second magnetic field reading.

15. The method of claim 11 further comprising:
providing an artificial neural network, resident on the administrator device, comprised of:
an input layer having a first set of nodes corresponding to a set of plant factors;
a hidden layer, connected to the input layer by a first set of synapses, having a second set of nodes; and,
a output layer, connected to the hidden layer by a second set of synapses, corresponding to the plant viability score.

16. The method of claim 15 wherein the step of generating the plant viability score further comprises the step of training the artificial neural network by:
receiving at least one of a set of training plant factors;
receiving a known viability score for the set of training plant factors;
setting a first set of random values for a first set of synapse weights, corresponding to the first set of synapses;
setting a second set of random values for a second set of synapse weights, corresponding to the second set of synapses;
calculating a first set of hidden values for the hidden layer by multiplying the set of training plant factors by the first set of synapse weights and normalizing;
calculating a first predicted plant viability score by multiplying the first set of hidden values with the second set of synapse weights and summing a first set of normalized node values;
comparing the first predicted plant viability score to the known viability score;
calculating an error in the first predicted plant viability score due to the first set of synapse weights and the second set of synapse weights; and,
adjusting the first set of synapse weights and the second set of synapse weights to create a third set of synapse weights and a fourth set of synapse weights to produce a trained artificial neural network.

17. The method of claim 16 wherein the step of generating the plant viability score further comprises:
receiving, at the system server, a request for the plant viability score, the request including the set of plant factors;
calculating, using the trained artificial neural network, a second set of hidden values by multiplying the set of plant factors with the third set of synapse weights and normalizing; and,
calculating the plant viability score by multiplying the second set of hidden values with the fourth set of synapse weights and summing a second set of normalized node values.

18. The method of claim 11 further comprising:
providing an artificial neural network, resident on the administrator device, comprised of:
an input layer, having a first set of nodes, corresponding to a set of images;
a convolutional layer, having a set of extracted feature maps, connected to the input layer;
a pooling layer, having a set of compressed feature maps corresponding to the set of extracted feature maps, connected to the convolutional layer;
a fully connected layer, having a second set of nodes, corresponding to a number of values in the set of compressed feature maps, connected to the pooling layer;
a hidden layer, having a third set of nodes, connected to the fully connected layer; and,
an output layer, having a fourth set of nodes, corresponding to a set of probability values related to a plant ID type, connected to the hidden layer.

19. The method of claim 18 wherein the set of instructions further comprise instructions that, when executed cause the system to perform the steps of training the artificial neural network by:
receiving a training image having a plurality of training image pixels;
receiving a known plant ID associated with the training image;
setting a first set of random values for a first set of synapse weights;
setting a second set of random values for a second set of synapse weights;
moving a first local window across a first plurality of sub-regions of the training image to obtain a first plurality of sub-region pixel sets associated with each extracted feature map of the set of extracted feature maps;
moving a second local window across a second plurality of sub-regions of the set of extracted feature maps to obtain a second plurality of sub-region pixel sets associated with each compressed feature map of the set of compressed feature maps;
translating the set of compressed feature maps into a first column matrix for the fully connected layer;
calculating a first set of hidden values for the hidden layer by multiplying the first column matrix by the first set of synapse weights and normalizing;
calculating a set of training plant ID probability values by multiplying the first set of hidden values with the second set of synapse weights and summing a first set of normalized node values;
generating a first predicted plant ID by determining a greatest value of the set of training plant ID probability values;
comparing the first predicted plant ID to the known plant ID;
calculating an error in the first predicted plant ID due to the first set of synapse weights and the second set of synapse weights; and,
adjusting the first set of synapse weights and the second set of synapse weights to create a third set of synapse weights and a fourth set of synapse weights to produce a trained artificial neural network.

20. The method of claim 19 wherein the step of detecting the plant type in the plant image further comprises:
receiving, at the system server, a request for the plant type, the request including the plant image;
moving a third local window across a third plurality of sub-regions of the plant image to obtain a third plurality of sub-region pixel sets associated with each extracted feature map of the set of extracted feature maps;
moving a fourth local window across a fourth plurality of sub-regions of the set of extracted feature maps to obtain a fourth plurality of sub-region pixel sets associated with each compressed feature map of the set of compressed feature maps;
translating the set of compressed feature maps into a second column matrix for the fully connected layer;
calculating a second set of hidden values for the hidden layer by multiplying the second column matrix by the third set of synapse weights and normalizing;

calculating a set of plant ID probability values by multiplying the second set of hidden values with the fourth set of synapse weights and summing a second set of normalized node values; and, generating the plant type by determining a greatest plant ID probability value of the set of plant ID probability values.

\* \* \* \* \*